(12) United States Patent
Thiers

(10) Patent No.: US 9,802,845 B2
(45) Date of Patent: Oct. 31, 2017

(54) INDUSTRIAL WATER PURIFICATION AND DESALINATION

(75) Inventor: Eugene Thiers, San Mateo, CA (US)

(73) Assignee: Sylvan Source, Inc., San Carlos, CA (US)

( * ) Notice: Subject to any disclaimer, the term of this patent is extended or adjusted under 35 U.S.C. 154(b) by 742 days.

(21) Appl. No.: 14/343,517

(22) PCT Filed: Sep. 7, 2012

(86) PCT No.: PCT/US2012/054221
§ 371 (c)(1),
(2), (4) Date: May 30, 2014

(87) PCT Pub. No.: WO2013/036804
PCT Pub. Date: Mar. 14, 2013

(65) Prior Publication Data
US 2014/0263081 A1    Sep. 18, 2014

Related U.S. Application Data

(66) Substitute for application No. 61/532,766, filed on Sep. 9, 2011.

(51) Int. Cl.
*C02F 1/52* (2006.01)
*C02F 1/66* (2006.01)
(Continued)

(52) U.S. Cl.
CPC .......... *C02F 1/5245* (2013.01); *B01D 1/0011* (2013.01); *B01D 5/0012* (2013.01);
(Continued)

(58) Field of Classification Search
CPC .......... C02F 1/5245; C02F 1/04; C02F 1/042; C02F 9/00; C02F 1/52; C02F 1/5236;
(Continued)

(56) References Cited

U.S. PATENT DOCUMENTS 2,165,044 A * 7/1939 Fox .......................... B01D 1/04
                                                            202/174
2,578,059 A * 12/1951 Graham .................... F28D 7/04
                                                            165/157

(Continued)

FOREIGN PATENT DOCUMENTS

CN          101289200 A       10/2008
CN          101456635 A        6/2009
(Continued)

OTHER PUBLICATIONS

IP Australia, "Examination Report," in corresponding Australian Patent Application No. 2012304381, dated Jul. 4, 2014, 3 pgs. (received Aug. 6, 2014).

(Continued)

*Primary Examiner* — Joseph Drodge
(74) *Attorney, Agent, or Firm* — Hahn Loeser & Parks, LLP

(57) ABSTRACT

This invention relates to the field of water purification and desalination. In particular, embodiments of the invention relate to systems and methods of removing essentially all of a broad spectrum of impurities from water in an automated industrial process that requires minimal cleaning or maintenance during the course of several months to several years, with relatively high yields of product water per unit of input water, flexibility with respect to energy sources, compact design with a low industrial foot-print, the ability to recover valuable by-products, and ultra-low energy requirements.

28 Claims, 7 Drawing Sheets

(51) Int. Cl.
F28D 15/02 (2006.01)
B01D 1/00 (2006.01)
B01D 5/00 (2006.01)
C02F 9/00 (2006.01)
C02F 1/04 (2006.01)

(52) U.S. Cl.
CPC ............ *B01D 5/0072* (2013.01); *C02F 1/042* (2013.01); *C02F 9/00* (2013.01); *F28D 15/02* (2013.01); *C02F 1/04* (2013.01); *C02F 1/5236* (2013.01); *C02F 1/66* (2013.01); *Y02W 10/37* (2015.05)

(58) Field of Classification Search
CPC . C02F 1/66; Y02W 10/37; B01D 1/00; B01D 1/30; B01D 1/35; B01D 5/00; B01D 5/003; B01D 5/0033; B01D 5/0009; B01D 5/0054; B01D 1/0011; B01D 1/0041; B01D 1/0047; B01D 1/0058; B01D 1/22; B01D 1/221; B01D 5/0003; B01D 5/0012; B01D 5/0015; B01D 5/0039; B01D 5/0051; B01D 5/0057; B01D 5/006; B01D 5/0069; B01D 5/0072; B01D 5/0075; B01D 5/0078; B01D 5/0081; B01D 5/009; B01D 5/0093; B01D 19/00; B01D 19/0021; B01D 19/0031; B01D 19/0063; B01D 19/0068; B01D 19/0073; B01D 53/00; B01D 53/002; B01D 53/005; B01D 2202/00; B01D 1/26; B01D 1/28; B01D 1/2881; B01D 1/2884; B01D 1/2887; B01D 1/289; B01D 1/2896; F28D 15/00; F28D 15/02; F28D 15/0258; F28D 15/0275; F28D 15/0283; F28F 1/00; F28F 9/04; F28F 2280/00; F28F 2280/06
USPC .. 95/241, 243, 244, 254, 14, 15, 19, 22, 24, 95/156, 157, 158, 159, 160, 161, 163, 95/165, 166, 169, 178, 179, 186, 187, 95/195, 196, 206, 209, 210, 214, 223, 95/227, 230, 245, 249–251; 96/155, 156, 96/176, 182, 218, 157, 158, 173, 174, 96/181, 188, 189, 201, 202, 219; 210/121, 149, 175, 182, 198.1, 202–205, 210/702, 718, 724, 774, 806, 86, 90, 97, 210/103, 104, 134, 137, 143, 180, 184, 210/188, 259, 739, 741, 742, 744; 203/6, 203/7, 10, 11, 21–24, 39, 40, 47, 91, 92, 203/95, 99, 100; 159/2.1, 22, 26.1–29, 159/31, 43, 43.1, 47.1, 1.1; 202/82, 84, 202/152, 163, 176–185.3, 200, 202, 204, 202/206, 270
See application file for complete search history.

(56) References Cited

U.S. PATENT DOCUMENTS

| | | | | |
|---|---|---|---|---|
| 2,894,879 A * | 7/1959 | Hickman | ............ | B01D 3/08 159/13.1 |
| RE25,232 E * | 8/1962 | Goeldner | ............ | B01D 3/065 159/2.3 |
| 3,203,894 A * | 8/1965 | Ikuno | ............ | C02F 5/02 210/667 |
| 3,245,883 A * | 4/1966 | Loebel | ............ | B01D 1/2818 159/13.3 |
| 3,868,308 A * | 2/1975 | Barak | ............ | B01D 1/04 159/17.2 |
| 4,356,785 A * | 11/1982 | Bailie | ............ | B63B 25/006 114/263 |
| 4,392,959 A | 7/1983 | Coillet | | |
| 4,488,344 A * | 12/1984 | McCurley | ............ | F16L 5/14 165/76 |
| 5,730,356 A * | 3/1998 | Mongan | ............ | F24D 19/0092 237/12.3 C |
| 6,059,974 A * | 5/2000 | Scheurman, III | ............ | C02F 1/42 210/662 |
| 6,635,150 B1 | 10/2003 | Le Goff et al. | | |
| 7,032,653 B1 * | 4/2006 | Chang | ............ | F28D 15/04 165/104.26 |
| 7,198,722 B2 | 4/2007 | Hussain | | |
| 7,678,235 B2 * | 3/2010 | Deep | ............ | B01D 1/305 159/44 |
| 8,771,477 B2 * | 7/2014 | Thiers | ............ | B01D 1/305 202/160 |
| 2005/0098499 A1 | 5/2005 | Hussain | | |
| 2006/0196836 A1 | 9/2006 | Arakel et al. | | |
| 2006/0230770 A1 * | 10/2006 | Kitsch | ............ | F25B 13/00 62/151 |
| 2007/0012556 A1 | 1/2007 | Lum et al. | | |
| 2007/0131534 A1 * | 6/2007 | Capan | ............ | B01D 3/103 203/39 |
| 2009/0308820 A1 | 12/2009 | Thiers et al. | | |
| 2010/0125044 A1 * | 5/2010 | Keister | ............ | E21B 21/068 507/200 |
| 2010/0158786 A1 | 6/2010 | Constantz et al. | | |
| 2011/0132840 A1 | 6/2011 | Choi et al. | | |
| 2012/0111539 A1 * | 5/2012 | Dai | ............ | F28D 15/046 165/104.26 |
| 2012/0118722 A1 * | 5/2012 | Holtzapple | ............ | B01D 1/12 203/11 |
| 2012/0267231 A1 * | 10/2012 | Capan | ............ | B01D 3/103 203/11 |

FOREIGN PATENT DOCUMENTS

| | | |
|---|---|---|
| CN | 101678367 A | 3/2010 |
| JP | 54-096252 A | 7/1979 |
| WO | WO 2005/056153 | 6/2005 |
| WO | WO 2005/056154 | 6/2005 |
| WO | WO 2006/118912 | 11/2006 |
| WO | 2007047674 A2 | 4/2007 |
| WO | WO 2007/047443 | 4/2007 |
| WO | WO 2010/033675 | 3/2010 |
| WO | WO 2010/118425 | 10/2010 |

OTHER PUBLICATIONS

Patent Cooperation Treaty, "International Preliminary Report on Patentability and Written Opinion" in corresponding International application No. PCT/US2012/054221, dated Mar. 12, 2014, 7 pgs.
Patent Cooperation Treaty, "International Search Report" in corresponding International application No. PCT/US2012/054221, dated Feb. 1, 2013, 3 pgs.
U.S. Appl. No. 60/526,580, filed Dec. 2, 2003, 7 pgs.
U.S. Appl. No. 60/676,870, filed May 2, 2005, 31 pgs.
U.S. Appl. No. 60/697,104, filed Jul. 6, 2005, 20 pgs.
U.S. Appl. No. 60/697,106, filed Jul. 6, 2005, 20 pgs.
U.S. Appl. No. 60/697,107, filed Jul. 6, 2005, 18 pgs.
Penghui Gao, Lixi Zhang & Hefei Zhang (2009) A new multi-effect desalinaton system with heat pipes by falling film evaporation in the vacuum, Desalination and Water Treatment, 10:1-3, 306-310, DOI: 10.5004/dwt.2009.929. http://doi.org/10.5004/dwt.2009.929.
Penghui Gao, Lixi Zhang & Hefei Zhang (2009) Study on heat transfer of falling film evaporation characteristics on heat pipes in negative pressure, Desalination and Water Treatment, 10:1-3, 311-316, DOI: 10.5004/dwt.2009.930. http://dx.doi.org/10.5004/dwt.2009.930.

* cited by examiner

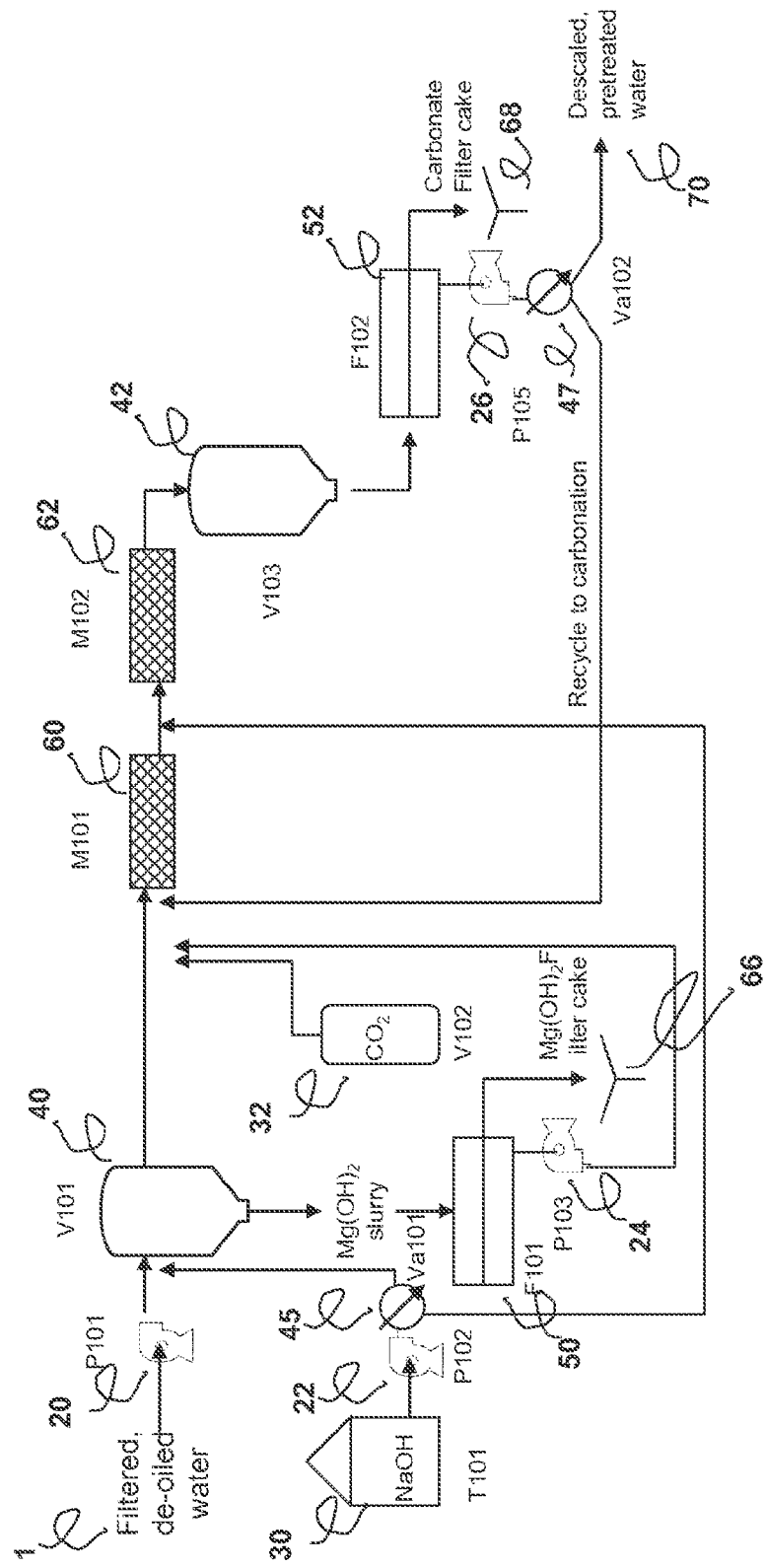
Figure 1 – Schematic Flowsheet of the Pre-Treatment Process

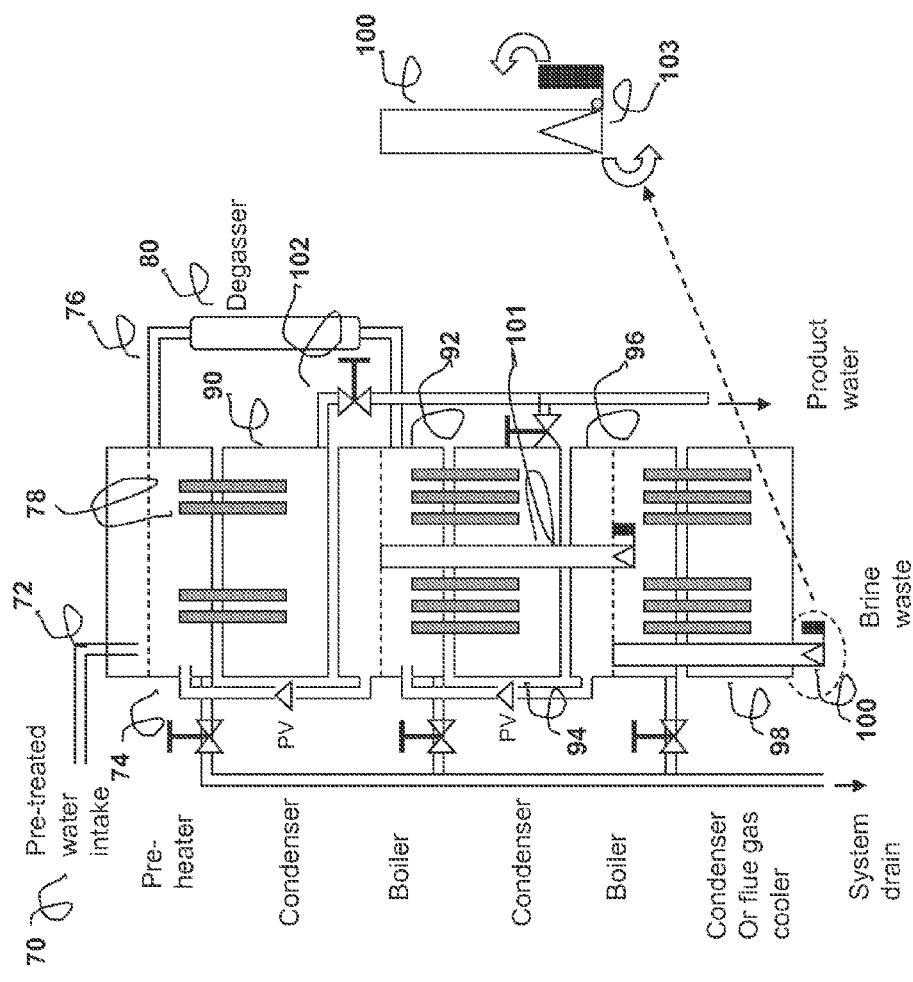
Figure 2 – Schematic View of a Desalinator with Two Stages

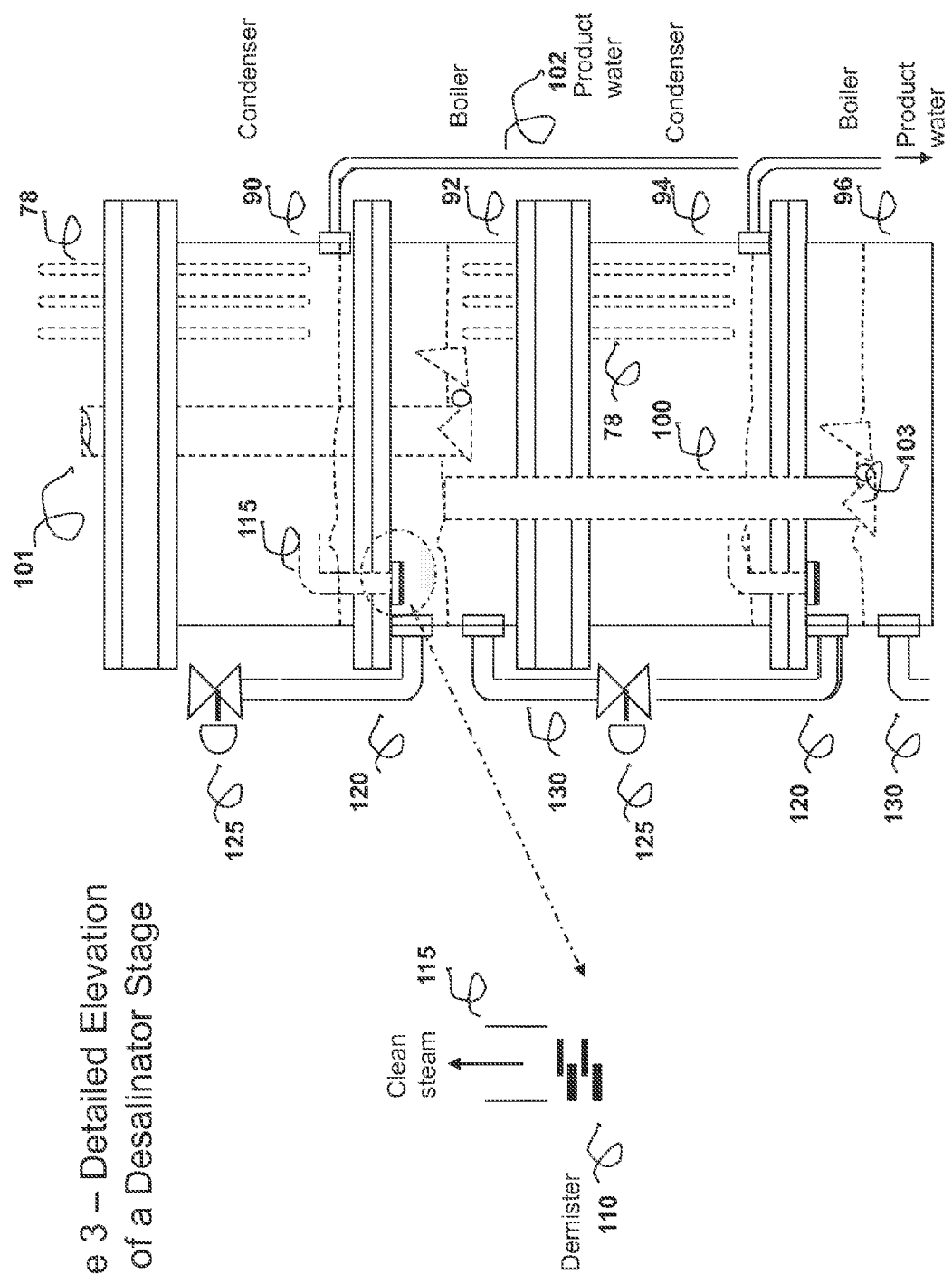

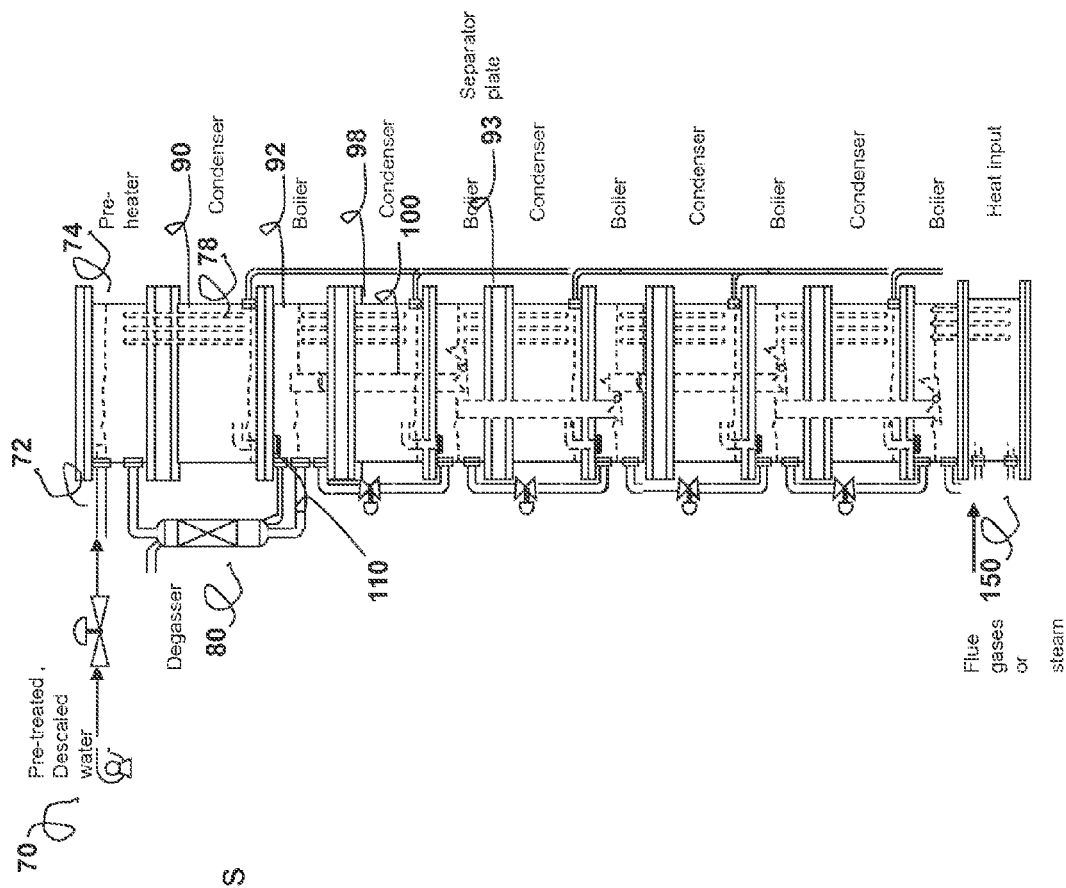
Figure 4 – Diagram of a Desalinator with Five Stages

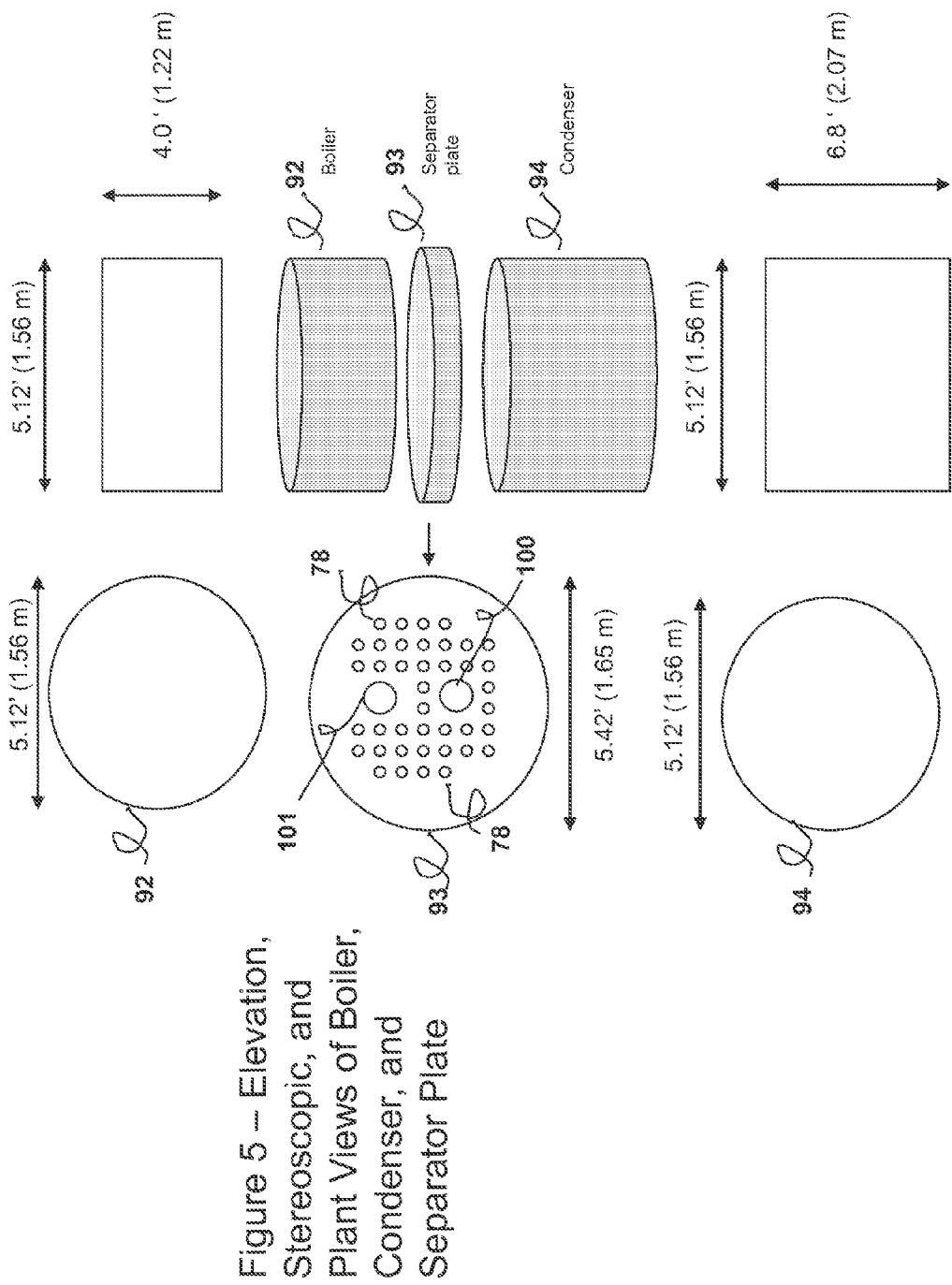
Figure 5 – Elevation, Stereoscopic, and Plant Views of Boiler, Condenser, and Separator Plate

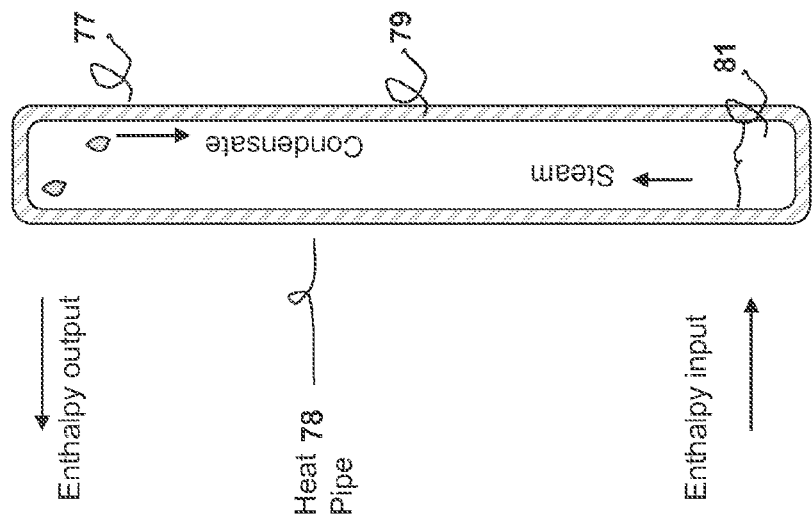
Figure 6 – Schematic Diagram of a Heat Pipe

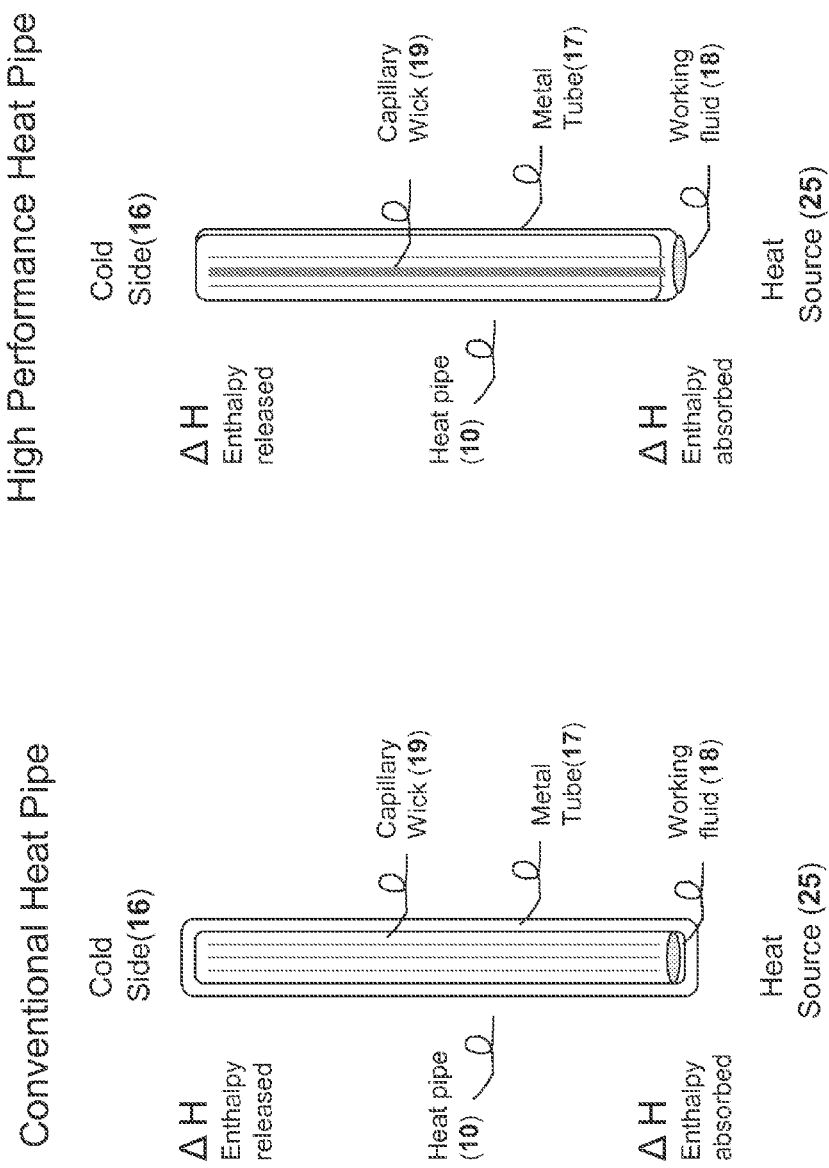

INDUSTRIAL WATER PURIFICATION AND DESALINATION

CROSS-REFERENCE TO RELATED APPLICATIONS

The present application is a U.S. National Stage entry under 35 U.S.C. §371 of International Application No. PCT/US2012/054221, filed on Sep. 7, 2013, designating the United States of America and published in English on Mar. 14, 2013, which in turn claims priority to U.S. Provisional Application No. 61/532,766, filed on Sep. 9, 2011, each of which is hereby incorporated by reference in its entirety.

BACKGROUND

Water purification technology is rapidly becoming an essential aspect of modern life as conventional water resources become increasingly scarce, municipal distribution systems for potable water deteriorate with age, and increased water usage depletes wells and reservoirs, causing saline water contamination. Additionally, further contamination of water sources is occurring from a variety of activities, which include, for example, intensive agriculture, gasoline additives, and heavy toxic metals. These issues are leading to increasing and objectionable levels of germs, bacteria, salts, MTBE, chlorates, perchlorates, arsenic, mercury, and even the chemicals used to disinfect potable water, in the water system.

Furthermore, even though almost three fourths of the earth is covered by oceans, only some 3% of this water exists as fresh water resources, and these resources are becoming increasingly scarce as a result of population growth and global warming. Approximately 69% of all fresh water is contained in ice caps and glaciers; with increased global melting, this fresh water becomes unrecoverable, so less than 1% is actually available, with the majority (over 90%) being ground water in aquifers that are being progressively contaminated by human activities and saline incursions. Thus, there is an urgent need for technology that can turn saline water, including seawater and brine, into fresh water, while removing a broad range of contaminants.

Conventional desalination and water treatment technologies, including reverse osmosis (RO) filtration and thermal distillation systems, such as multiple-effect distillation (MED), multiple-stage flash distillation (MSF), and vapor compression distillation (VC), are rarely able to handle the diverse range of water contaminants found in saline environments. Additionally, even though they are commercially available, they often require multiple treatment stages or some combination of various technologies to achieve acceptable water quality. RO systems suffer from the requirement of high-water pressures as the saline content increases, rendering them expensive in commercial desalination, and they commonly waste more than 40% of the incoming feed water, making them progressively less attractive when water is scarce. Moreover, RO installations produce copious volumes of waste brine that are typically discarded into the sea, resulting in high saline concentrations that are deadly to fish and shellfish. Less conventional technologies, such as ultraviolet (UV) light irradiation or ozone treatment, can be effective against viruses and bacteria but seldom remove other contaminants, such as dissolved gases, salts, hydrocarbons, and insoluble solids. Additionally, while most distillation technologies may be superior at removing a subset of contaminants, they rarely can handle all types of contaminants.

Because commercial desalination plants are normally complex engineering projects that require one to three years of construction, they are typically capital intensive and difficult to move from one place to another. Their complexity and reliance on multiple technologies also make them prone to high maintenance costs. Because RO plants are designed to operate continuously under steady pressure and flow conditions, large pressure fluctuations or power interruptions can damage the membranes, which are expensive to replace; the incoming feed water therefore requires extensive pre-treatment to prevent fouling of the RO membrane.

Thermal distillation systems, such as those described by LeGolf et al. (U.S. Pat. No. 6,635,150 B1) include MED systems, which rely on multiple evaporation and condensation steps that operate under vacuum in order to effect evaporation at temperatures lower than the normal boiling point of water. Such technologies are commercially used for desalination in various countries, but they all operate according to different physico-chemical principles. For example, MED, MSF, and VC systems all require vacuum, which means that the product water cannot be sterilized because evaporation occurs at temperatures lower than those needed for sterilization; also, vacuum systems tend to leak and require mechanical reinforcement. In addition, heat transfer and heat recovery in MED, MSF, and VC systems involve heat exchange across membranes or thin metal surfaces, but heat exchangers are prone to fouling and scale formation and require frequent maintenance.

More recently, Thiers (PCT Application No.: US2009/57277, entitled Large Scale Water Purification and Desalination, filed Sep. 17, 2009, and PCT Application No.: US2010/030759, entitled Method and System for Reduction of Scaling in Purification of Aqueous Solutions, filed Apr. 12, 2010) has described a method of pre-treatment that removes scale-forming constituents from a water stream and large scale embodiments for a desalination system. However, the earlier pre-treatment system described by Thiers relies on a final thermal treatment that involves heating to 120° C. for several minutes of residence time, which, while technically effective, represents a significant energy consumption. There is a need for a pre-treatment method that minimizes energy consumption while still removing scale-forming constituents from an aqueous stream. In addition, the embodiments described by Thiers for a large-scale desalination and water treatment fail to address transient phenomena encountered during start-up and shut down operations and do not properly ensure the maintenance of a stable hydraulic head between different boiling stages. There is a need for industrial configurations that are stable during start-up and shut down procedures, in addition to being stable during normal operation.

There is a need for inexpensive and effective pre-treatment methods that eliminate scale-forming compounds. There is a further need for industrial desalination and water treatment systems that are continuous and largely self-cleaning, that resist corrosion and scaling, that are modular and compact, that recover a major fraction of the input water while producing a highly concentrated waste brine that crystallizes into a solid salt cake, and that are relatively inexpensive and low-maintenance.

SUMMARY

The present invention describes various industrial embodiments for an improved desalination and water purification system. The system includes a pre-treatment section that prevents scale formation and a desalination section that consists of an inlet, a preheater, a degasser, multiple evaporation chambers and demisters, product condensers, a waste outlet, a product outlet, multiple heat pipes for heat transfer and recovery, and a control system. The control system permits operation of the purification system continuously with minimal user intervention or cleaning. The system is capable of removing, from a contaminated water sample, a plurality of contaminant types including microbiological contaminants, radiological contaminants, metals, salts, volatile organics, and non-volatile organics. In embodiments of the system and depending on the salinity of the incoming water stream, the volume of water produced can range from about 20% to in excess of 95% of a volume of input water. The system comprises a vertical stack arrangement of boiling chambers, condensers, and a preheater that is compact and portable. The system is capable of water production in the range of 1,000 to 50 million gallons per day.

The pre-treatment section precipitates scale-forming compounds by means of pH adjustment. Addition of either caustic or lime initially precipitates magnesium hydroxide, which is subsequently removed by filtration or sedimentation, or both. Next, the concentration of bicarbonate ions is adjusted by dissolving $CO_2$ or adding bicarbonate or soluble carbonate salts to correspond to the stoichiometric composition of the remaining calcium, magnesium, and other divalent cations in solution, and the pH is again adjusted to values of 9.8 and higher in order to precipitate scale-forming compounds as insoluble carbonates. Following filtration or sedimentation to remove precipitates, the clear pre-treated solution then flows into the desalination section.

The desalination section consists of a vertical stack of boilers, condensers, and demisters with a preheating tank, a degasser, and a heat transfer vessel. The preheating vessel raises the temperature of the incoming water to near the boiling point and can be placed on the top or at the bottom of the vertical stack. Water exiting the preheating tank can have a temperature of at least about 96° C. The preheating tank may have a spiral arrangement of vanes such that incoming water circulates several turns in the tank, thus providing sufficient residence time to effect preheating. Incoming feed water enters the preheating tank tangentially, is gradually preheated by heat pipes until the required temperature is achieved, and exits the preheating tank through a downcomer tube that connects either with the degasser or directly with a lower boiling chamber if there is no need for degassing.

A degasser, which is placed near the top of the vertical stack, removes gases and organic contaminants that may be volatile or non-volatile by means of counter-current stripping of the incoming water against low-pressure steam. The degasser can be in a substantially vertical orientation, having an upper end and a lower end. Pre-heated water enters the degasser at its upper end, and degassed water exits the degasser proximate to the lower end. In the system, steam from the highest evaporation chamber can enter the degasser proximate to the lower end and can exit the degasser proximate to the upper end. The degasser can include a matrix adapted to facilitate mixing of water and steam, stripping the inlet water of essentially all organics, volatiles, and gases by counterflowing the inlet water against an opposite directional flow of a gas in a degasser. The gas can be, for example, steam, air, nitrogen, and the like. The matrix can include substantially spherical particles. However, the matrix can also include non-spherical particles. The matrix can include particles having a size selected to permit uniform packing within the degasser. The matrix can also include particles of distinct sizes, and the particles can be arranged in the degasser in a size gradient. Water can exit the degasser substantially free of organics and volatile gases.

The heat-transfer vessel provides the heat energy for the entire system and can consist of a condenser chamber operating with low-pressure waste steam. Alternatively, it can be a combustion chamber that operates with any type of fuel or a vessel that absorbs heat from a working fluid from recuperators, solar heaters, or economizers.

Pre-treated water is first preheated to near the boiling point and enters a degasser proximate the upper end of the vertical stack, where gases and hydrocarbons are removed. The degassed water then enters an upper boiler, where a portion of the incoming water is turned into steam; a portion of the steam produced in the upper boiler may be used to provide the required steam for degassing, while the balance enters a demister that removes entrained micro-droplets and is condensed into pure water in a condenser chamber immediately above the boiler. As some of the incoming water in the upper boiler evaporates, the balance of the water becomes progressively more concentrated in soluble salts and continuously cascades downward into a series of lower boilers until it exits the lowermost boiler as a heavy brine at near the solubility limit of the salt solution.

Concurrent with incoming water cascading downward, heat is provided at the heat-transfer vessel and is progressively transferred upwards by means of heat pipes. Heat pipes are highly efficient enthalpy transfer devices that operate with a small temperature difference between their hot and cold ends. A number of heat pipes transfer the heat provided at the heat-transfer vessel to the bottom boiler. The steam produced at the bottom boiler is largely recovered as the heat of condensation in the bottom condenser, where another set of heat pipes transfers that heat to an upper boiler, thus progressively re-using the heat for multiple evaporation and condensation chambers.

BRIEF DESCRIPTION OF THE DRAWINGS

FIG. 1 is a schematic flowsheet of the pre-treatment process.

FIG. 2 is a schematic view of a desalinator with two stages.

FIG. 3 is a detailed elevation view of a desalinator stage.

FIG. 4 is a diagram of a desalinator with five stages.

FIG. 5 provides elevation, stereoscopic, and plant views of the boiler, the condenser, and the separator plate.

FIG. 6 is a schematic diagram of a heat pipe.

FIG. 7 is a schematic view of a high-performance heat pipe.

DETAILED DESCRIPTION

Embodiments of the invention are disclosed herein, in some cases in exemplary form or by reference to one or more Figures. However, any such disclosure of a particular embodiment is exemplary only and is not indicative of the full scope of the invention.

Embodiments of the invention include systems, methods, and apparatuses for water purification and desalination. Preferred embodiments provide broad spectrum water purification that is fully automated and can operate over very long periods of time without requiring cleaning or user intervention. For example, systems disclosed herein can run without user control or intervention for 2, 4, 6, 8, 10, or 12 months, or longer. In preferred embodiments, the systems can run automatically for 1, 2, 3, 4, 5, 6, 7, 8, 9, 10, 11, 12, 13, 14, or years, or more.

Embodiments of the invention thus provide a water purification and desalination system including at least an inlet for saline water, contaminated water, or seawater, a preheater, a degasser, one or more evaporation chambers, one or more demisters, and one or more product condensers with a product outlet, a waste outlet, and a control system, wherein product water exiting the outlet is substantially pure, and wherein the control system permits operation of the purification system continuously without requiring user intervention. In preferred embodiments, the volume of product water produced is at least about 20, 25, 30, 35, 40, 45, 50, 55, 60, 65, 70, 75, 80, 85, 90, 95, 96, 97, 98, or 99%, or more, of the volume of input water. Thus, the system is of great benefit in conditions in which there is relatively high expense or inconvenience associated with obtaining inlet water and/or disposing of wastewater. The system is significantly more efficient in terms of its production of product water per unit of input water or wastewater than many other systems.

Substantially pure water can be, in different embodiments, water that meets any of the following criteria: water purified to a purity, with respect to any contaminant, that is at least 25, 30, 35, 40, 45, 50, 55, 60, 65, 70, 75, 80, 85, 90, 95, 100, 125, 150, 175, 200, 250, 500, 750, 1000, or more, times greater in purity than the inlet water. In other embodiments, substantially pure water is water that is purified to one of the foregoing levels, with respect to a plurality of contaminants present in the inlet water. That is, in these embodiments, water purity or quality is a function of the concentration of an array of one or more contaminants, and substantially pure water is water that has, for example, a 25-fold or greater ratio between the concentration of these contaminants in the inlet water as compared to the concentration of the same contaminants in the product water.

In other embodiments, water purity can be measured by conductivity, where ultrapure water has a conductivity typically less than about 1 μSiemens, and distilled water typically has a conductivity of about 5. In such embodiments, conductivity of the product water is generally between about 1 and 7, typically between about 2 and 6, preferably between about 2 and 5, 2 and 4, or 2 and 3. Conductivity is a measure of total dissolved solids (TDS) and is a good indicator of water purity with respect to salts, ions, minerals, and the like.

Alternatively, water purity can be measured by various standards, such as, for example, current U.S. Environmental Protection Agency (EPA) standards as listed in Table 1 and Table 2, as well as other accepted standards as listed in Table 2. Accordingly, preferred embodiments of the invention are capable of reducing any of one or more contaminants from a broad range of contaminants, including, for example, any contaminant(s) listed in Table 1, wherein the final product water has a level for such contaminant(s) at or below the level specified in the column labeled "MCL" (maximum concentration level), where the inlet water has a level for such contaminant(s) that is up to about 25-fold greater than the specified MCL. Likewise, in some embodiments and for some contaminants, systems of the invention can remove contaminants to MCL levels when the inlet water has a contamination that is 30-, 40-, 50-, 60-, 70-, 80-, 90-, 100-, 150-, 250-, 500-, or 1000-fold, or more, higher than the MCL or the product water.

While the capacity of any system to remove contaminants from inlet water is to some extent a function of the total impurity levels in the inlet water, systems of the invention are particularly well suited to remove a plurality of different contaminants, of widely different types, from a single feed stream, producing water that is comparable to distilled water and is in some cases comparable to ultrapure water. It should be noted that the "Challenge Water" column in Table 1 contains concentration levels for contaminants in water used in EPA tests. Preferred embodiments of water purification systems of the invention typically can remove much greater amounts of initial contaminants than the amounts listed in this column. However, contaminant levels corresponding to those mentioned in the "Challenge Water" column are likewise well within the scope of the capabilities of embodiments of the invention.

TABLE 1

Water Contaminant Concentration Levels and Testing Protocols

| | Units | Protocol | MCL | Challenge Water |
|---|---|---|---|---|
| 1. Metals | | | | |
| Aluminum | ppm | | 0.2 | 0.6 |
| Antimony | ppm | | 0.006 | 0.1 |
| Arsenic | ppm | | 0.01 | 0.1 |
| Beryllium | ppm | | 0.004 | 0.1 |
| Boron | ppb | | | 20 |
| Chromium | ppm | | 0.1 | 0.1 |
| Copper | ppm | | 1.3 | 1.3 |
| Iron | ppm | | 0.3 | 8 |
| Lead | ppm | | 0.015 | 0.1 |
| Manganese | ppm | | 0.05 | 1 |
| Mercury | ppm | | 0.002 | 0.1 |
| Molybdenum | ppm | | | 0.01 |
| Nickel | ppm | | | 0.02 |
| Silver | ppm | | 0.1 | 0.2 |
| Thallium | ppm | | 0.002 | 0.01 |
| Vanadium | ppm | | | 0.1 |
| Zinc | ppm | | 5 | 5 |
| Subtotal of entire mix | | | | 36.84 |
| 2. Inorganic Salts | | | | |
| Bromide | ppm | | | 0.5 |
| Chloride | ppm | | 250 | 350 |
| Cyanide | ppm | | 0.2 | 0.4 |
| Fluoride | ppm | | 4 | 8 |
| Nitrate, as $NO_3$ | ppm | | 10 | 90 |
| Nitrite, as $N_2$ | ppm | | 1 | 2 |
| Sulfate | ppm | | 250 | 350 |
| Subtotal of entire mix | | | | 800.9 |
| 3. 2 Highly Volatile VOCs + 2 Non-Volatiles | | | | |
| Heptachlor | ppm | EPA525.2 | 0.0004 | 0.04 |
| Tetrachloroethylene-PCE | ppm | EPA524.2 | 0.00006 | 0.02 |
| Epichlorohydrin | ppm | | 0.07 | 0.2 |
| Pentachlorophenol | ppm | EPA515.4 | 0.001 | 0.1 |
| Subtotal of entire mix | | | | 0.36 |
| 4. 2 Highly Volatile VOCs + 2 Non-Volatiles | | | | |
| Carbon tetrachloride | ppm | EPA524.2 | 0.005 | 0.01 |
| m,p-Xylenes | ppm | EPA524.2 | 10 | 20 |
| Di(2-ethylhexyl) adipate | ppm | EPA525.2 | 0.4 | 0.8 |
| Trichloroacetic acid | ppm | SM6251B | 0.06 | 0.12 |
| Subtotal of entire mix | | | | 20.93 |
| 5. 3 Highly Volatile VOCs + 3 Non-Volatiles | | | | |
| 1,1-Dichloroethylene | ppm | | 0.007 | 0.15 |
| Ethylbenzene | ppm | EPA524.2 | 0.7 | 1.5 |
| Aldrin | ppm | EPA505 | 0.005 | 0.1 |
| Dalapon (2,2-dichloropropionic acid) | ppm | EPA515.4 | 0.2 | 0.4 |

TABLE 1-continued

Water Contaminant Concentration Levels and Testing Protocols

| | Units | Protocol | MCL | Challenge Water |
|---|---|---|---|---|
| Carbofuran (furadan) | ppm | EPA531.2 | 0.04 | 0.1 |
| Fenoprop (2,4,5-TP, Silvex) | ppm | EPA515.4 | 0.05 | 0.1 |
| Subtotal of entire mix | | | | 2.35 |
| 6. 3 Highly Volatile VOCs + 3 Non-Volatiles | | | | |
| Trichloroethylene-TCE | ppm | EPA524.2 | 0.005 | 0.1 |
| Toluene | ppm | EPA524.2 | 1 | 2 |
| 1,2,4-Trichlorobenzene | ppm | EPA524.2 | 0.07 | 0.15 |
| 2,4-D (2,4-dichlorophenoxyacetic acid) | ppm | EPA515.4 | 0.07 | 0.15 |
| Alachlor (Alanex) | ppm | EPA525.2 | 0.002 | 0.1 |
| Simazine | ppm | EPA525.2 | 0.004 | 0.1 |
| Subtotal of entire mix | | | | 2.6 |
| 7. 3 Highly Volatile VOCs + 3 Non-Volatiles | | | | |
| Vinylchloride (chloroethene) | ppm | EPA524.2 | 0.002 | 0.1 |
| 1,2-Dichlorobenzene (1,2-DCB) | ppm | EPA524.2 | 0.6 | 1 |
| Chlorobenzene | ppm | EPA524.2 | 0.1 | 0.2 |
| Atrazine | ppm | EPA525.2 | 0.003 | 0.1 |
| Endothal | ppm | EPA548.1 | 0.01 | 0.2 |
| Oxamyl (Vydate) | ppm | EPA531.2 | 0.2 | 0.4 |
| Subtotal of entire mix | | | | 2.0 |
| 8. 3 Highly Volatile VOCs + 3 Non-Volatiles | | | | |
| Styrene | ppm | EPA524.2 | 0.1 | 1 |
| Benzene | ppm | EPA524.2 | 0.005 | 0.2 |
| Methoxychlor | ppm | EPA525.2/505 | 0.04 | 0.1 |
| Glyphosate | ppm | EPA547 | 0.7 | 1.5 |
| Pichloram | ppm | EPA515.4 | 0.5 | 1 |
| 1,3-Dichlorobenzene (1,3-DCB) | ppm | EPA524.2 | 0.075 | 0.15 |
| Subtotal of entire mix | | | | 3.95 |
| 9. 3 Highly Volatile VOCs + 3 Non-Volatiles | | | | |
| 1,2-Dichloropropane (DCP) | ppm | EPA524.2 | 0.005 | 0.1 |
| Chloroform | ppm | EPA524.2 | 80 | 0.1 |
| Bromomethane (methyl bromide) | ppm | EPA524.2 | | 0.1 |
| PCB 1242 (Aroclor 1242) | ppb | EPA505 | 0.5 | 1 |
| Chlordane | ppm | EPA525.2/505 | 0.002 | 0.2 |
| MEK (methylehtylketone, 2-butanone) | ppb | EPA524.2 | | 0.2 |
| Subtotal of entire mix | | | | 1.7 |
| 10. Group: 4 VOCs + 5 Non-Volatile PCBs | | | | |
| 2,4-DDE (dichlorodiphenyl dichloroethylene) | ppm | EPA525.2 | | 0.1 |
| Bromodichloromethane | ppb | EPA524.2 | 80 | 0.1 |
| 1,1,1-Trichloroethane (TCA) | ppm | EPA524.2 | 0.2 | 0.4 |
| Bromoform | ppm | EPA524.2 | 80 | 0.1 |
| PCB 1221 (Aroclor 1221) | ppm | EPA505 | 0.5 | 0.05 |
| PCB 1260 (Aroclor 1260) | ppm | EPA505 | 0.5 | 0.05 |
| PCB 1232 (Aroclor 1232) | ppm | EPA505 | 0.5 | 0.05 |
| PCB 1254 (Aroclor 1254) | ppm | EPA505 | 0.5 | 0.05 |
| PCB 1016 (Aroclor 1016) | ppm | EPA505 | 0.5 | 0.05 |
| Subtotal of entire mix | | | | 0.95 |
| 11. 5 VOCs + 5 Non-Volatile PCBs | | | | |
| Dichloromethane (DCM, methylene chloride) | ppm | EPA524.2 | 0.005 | 0.1 |
| 1,2-Dichloroethane | ppm | | 0.005 | 0.1 |
| Lindane (gamma-BHC) | ppm | EPA525.2 | 0.0002 | 0.05 |
| Benzo[a]pyrene | ppm | EPA525.2 | 0.0002 | 0.05 |
| Endrin | ppm | EPA525.2/505 | 0.002 | 0.05 |
| 1,1,2-Trichloroethane (TCA) | ppm | EPA524.2 | 0.005 | 0.05 |
| MTBE (methyl t-butyl ether) | ppm | EPA524.2 | | 0.05 |
| Ethylene dibromide (EDB) | ppm | EPA504.1 | 0.00005 | 0.05 |
| Dinoseb | ppm | EPA515.4 | 0.007 | 0.05 |
| Bis(2-ethylhexyl) phthalate (DEHP) | ppm | EPA525.2 | 0.006 | 0.05 |
| Subtotal of entire mix | | | | 0.6 |
| 12. 6 VOCs | | | | |
| Chloromethane (methyl chloride) | ppm | EPA524.2 | | 0.1 |
| Toxaphene | ppm | EPA505 | 0.003 | 0.1 |
| trans-1,2-Dichloroethylene | ppm | EPA524.2 | 0.1 | 0.2 |
| Dibromochloromethane | ppm | EPA524.2 | 80 | 0.05 |
| cis-1,2-Dichloroethylene | ppm | EPA524.2 | 0.07 | 0.05 |
| 1,2-Dibromo-3-chloro propane | ppm | EPA504.1 | 0.0002 | 0.05 |
| Subtotal of entire mix | | | | 0.55 |

Determination of water purity and/or efficiency of purification performance can be based upon the ability of a system to remove a broad range of contaminants. For many biological contaminants, the objective is to remove substantially all live contaminants. Table 2 lists additional common contaminants of source water and standard protocols for testing levels of these contaminants. The protocols listed in Tables 1 and 2 are publicly available at www.epa.gov/safewater/mcl.html#mcls for common water contaminants, as well as *Methods for the Determination of Organic Compounds in Drinking Water*, EPA/600/4-88-039, December 1988, revised July 1991. Methods 547, 550, and 550.1 are in *Methods for the Determination of Organic Compounds in Drinking Water-Supplement I*, EPA/600-4-90-020, July 1990. Methods 548.1, 549.1, 552.1, and 555 are in *Methods for the Determination of Organic Compounds in Drinking Water-Supplement II*, EPA/600/R-92-129, August 1992. Methods 502.2, 504.1, 505, 506, 507, 508, 508.1, 515.2, 524.2 525.2, 531.1, 551.1, and 552.2 are in *Methods for the Determination of Organic Compounds in Drinking Water-Supplement III*, EPA/600/R-95-131, August 1995. Method 1613 is titled "Tetra- through Octa-Chlorinated Dioxins and Furans by Isotope Dilution HRGC/HRMS," EPA/821-B-94-005, October 1994. Each of the foregoing is incorporated herein by reference in its entirety.

TABLE 2

Water Contaminant Testing Protocols

| | Protocol |
|---|---|
| 1 Metals and Inorganics | |
| Asbestos | EPA100.2 |
| Free cyanide | SM 4500CN-F |
| Metals - Al, Sb, Be, B, Fe, Mn, Mo, Ni, Ag, Tl, V, Zn | EPA200.7/200.8 |
| Anions - $NO_3$—N, $NO_2$—N, Cl, $SO_4$, total nitrates/nitrites | EPA300.0A |
| Bromide | EPA300.0/300.1 |
| Turbidity | EPA180.1 |
| 2 Organics | |
| Volatile organics - VOASDWA list + nitrozbenzene | EPA524.2 |
| EDB and DBCP | EPA504.1 |
| Semivolatile organics - ML525 list + EPTC | EPA525.2 |
| Pesticides and PCBs | EPA505 |
| Herbicides - regulated/unregulated compounds | EPA515.4 |
| Carbamates | EPA531.2 |
| Glyphosate | EPA547 |
| Diquat | EPA549.2 |
| Dioxin | EPA1613b |
| 1,4-Dioxane | EPA8270m |
| NDMA - 2 ppt MRL | EPA1625 |
| 3 Radiologicals | |
| Gross alpha and beta | EPA900.0 |
| Radium 226 | EPA903.1 |
| Uranium | EPA200.8 |
| 4 Disinfection By-Products | |
| THMs/HANs/HKs | EPA551.1 |
| HAAs | EPA6251B |
| Aldehydes | SM 6252m |
| Chloral hydrate | EPA551.1 |
| Chloramines | SM 4500 |
| Cyanogen chloride | EPA524.2m |

TABLE 3

Exemplary Contaminants for System Verification

| | MCLG[1] |
|---|---|
| 1 Metals & Inorganics | |
| Asbestos | <7 MFL[2] |
| Free cyanide | <0.2 ppm |
| Metals - Al, Sb, Be, B, Fe, Mn, Mo, Ni, Ag, Tl, V, Zn | 0.0005 ppm |
| Anions - $NO_3$—N, $NO_2$—N, Cl, $SO_4$, total nitrates/nitrites | <1 ppm |
| Turbidity | <0.3 NTU |
| 2 Organics | |
| Volatile organics - VOASDWA list + nitrobenzene EDB and DBCP | 0 ppm |
| Semivolatile organics - ML525 list + EPTC | <0.001 ppm |
| Pesticides and PCBs | <0.2 ppb |
| Herbicides - regulated/unregulated compounds | <0.007 ppm |
| Glyphosate | <0.7 ppm |
| Diquat | <0.02 ppm |
| Dioxin | 0 ppm |
| 3 Radiologicals | |
| Gross alpha and beta | <5 pCi/l[3] |
| Radium 226 | 0 pCi/l[3] |
| Uranium | <3 ppb |
| 4 Disinfection By-Products | |
| Chloramines | 4 ppm |
| Cyanogen chloride | 0.1 ppm |
| 5 Biologicals | |
| *Cryptosporidium* | 0[4] |
| *Giardia lamblia* | 0[4] |
| Total coliforms | 0[4] |

[1]MCLG = maximum concentration limit guidance
[2]MFL = million fibers per liter
[3]pCi/l = pico Curies per liter
[4]Substantially no detectable biological contaminants Overall Description of Water Pre-Treatment System The objective of the pre-treatment system is to reduce scale-forming compounds to a level at which they will not interfere by forming scale in subsequent treatment, particularly during desalination. Water hardness is normally defined as the amount of calcium ($Ca^{++}$), magnesium ($Mg^{++}$), and other divalent ions that are present in the water and is normally expressed in parts per million (ppm) of these ions or their equivalent as calcium carbonate ($CaCO_3$). Scale forms because the water dissolves carbon dioxide from the atmosphere, and such carbon dioxide provides carbonate ions that combine to form both calcium and magnesium carbonates; upon heating, the solubility of calcium and magnesium carbonates markedly decreases, and they precipitate as scale. In reality, scale comprises any chemical compound that precipitates from solution. Thus, iron phosphates and calcium sulfate (gypsum) also produce scale. Table 4 lists a number of chemical compounds that exhibit low solubility in water and can thus form scale. In this context, low solubility is defined by the solubility product, that is, by the product of the ionic concentration of cations and anions of a particular chemical; solubility is usually expressed in moles per liter (mol/L).

TABLE 4

Solubility Products of Various Compounds

| Compound | Formula | $K_{sp}$ (25° C.) |
|---|---|---|
| Aluminum hydroxide | $Al(OH)_3$ | $3 \times 10^{-34}$ |
| Aluminum phosphate | $AlPO_4$ | $9.84 \times 10^{-21}$ |
| Barium bromate | $Ba(BrO_3)_2$ | $2.43 \times 10^{-4}$ |
| Barium carbonate | $BaCO_3$ | $2.58 \times 10^{-9}$ |
| Barium chromate | $BaCrO_4$ | $1.17 \times 10^{-10}$ |
| Barium fluoride | $BaF_2$ | $1.84 \times 10^{-7}$ |
| Barium hydroxide octahydrate | $Ba(OH)_2 \times 8H_2O$ | $2.55 \times 10^{-4}$ |
| Barium iodate | $Ba(IO_3)_2$ | $4.01 \times 10^{-9}$ |
| Barium iodate monohydrate | $Ba(IO_3)_2 \times H_2O$ | $1.67 \times 10^{-9}$ |
| Barium molybdate | $BaMoO_4$ | $3.54 \times 10^{-8}$ |
| Barium nitrate | $Ba(NO_3)_2$ | $4.64 \times 10^{-3}$ |
| Barium selenate | $BaSeO_4$ | $3.40 \times 10^{-8}$ |
| Barium sulfate | $BaSO_4$ | $1.08 \times 10^{-10}$ |
| Barium sulfite | $BaSO_3$ | $5.0 \times 10^{-10}$ |
| Beryllium hydroxide | $Be(OH)_2$ | $6.92 \times 10^{-22}$ |
| Bismuth arsenate | $BiAsO_4$ | $4.43 \times 10^{-10}$ |
| Bismuth iodide | $BiI$ | $7.71 \times 10^{-19}$ |
| Cadmium arsenate | $Cd_3(AsO_4)_2$ | $2.2 \times 10^{-33}$ |
| Cadmium carbonate | $CdCO_3$ | $1.0 \times 10^{-12}$ |
| Cadmium fluoride | $CdF_2$ | $6.44 \times 10^{-3}$ |
| Cadmium hydroxide | $Cd(OH)_2$ | $7.2 \times 10^{-15}$ |
| Cadmium iodate | $Cd(IO_3)_2$ | $2.5 \times 10^{-8}$ |
| Cadmium oxalate trihydrate | $CdC_2O_4 \times 3H_2O$ | $1.42 \times 10^{-8}$ |
| Cadmium phosphate | $Cd_3(PO_4)_2$ | $2.53 \times 10^{-33}$ |
| Cadmium sulfide | $CdS$ | $1 \times 10^{-27}$ |
| Cesium perchlorate | $CsClO_4$ | $3.95 \times 10^{-3}$ |
| Cesium periodate | $CsIO_4$ | $5.16 \times 10^{-6}$ |

TABLE 4-continued

Solubility Products of Various Compounds

| Compound | Formula | $K_{sp}$ (25° C.) |
|---|---|---|
| Calcium carbonate (calcite) | $CaCO_3$ | $3.36 \times 10^{-9}$ |
| Calcium carbonate (aragonite) | $CaCO_3$ | $6.0 \times 10^{-9}$ |
| Calcium fluoride | $CaF_2$ | $3.45 \times 10^{-11}$ |
| Calcium hydroxide | $Ca(OH)_2$ | $5.02 \times 10^{-6}$ |
| Calcium iodate | $Ca(IO_3)_2$ | $6.47 \times 10^{-6}$ |
| Calcium iodate hexahydrate | $Ca(IO_3)_2 \times 6H_2O$ | $7.10 \times 10^{-2}$ |
| Calcium molybdate | $CaMoO$ | $1.46 \times 10^{-8}$ |
| Calcium oxalate monohydrate | $CaC_2O_4 \times H_2O$ | $2.32 \times 10^{-9}$ |
| Calcium phosphate | $Ca_3(PO_4)_2$ | $2.07 \times 10^{-33}$ |
| Calcium sulfate | $CaSO_4$ | $4.93 \times 10^{-5}$ |
| Calcium sulfate dihydrate | $CaSO_4 \times 2H_2O$ | $3.14 \times 10^{-5}$ |
| Calcium sulfate hemihydrate | $CaSO_4 \times 0.5H_2O$ | $3.1 \times 10^{-7}$ |
| Cobalt(II) arsenate | $Co_3(AsO_4)_2$ | $6.80 \times 10^{-29}$ |
| Cobalt(II) carbonate | $CoCO_3$ | $1.0 \times 10^{-10}$ |
| Cobalt(II) hydroxide (blue) | $Co(OH)_2$ | $5.92 \times 10^{-15}$ |
| Cobalt(II) iodate dihydrate | $Co(IO_3)_2 \times 2H_2O$ | $1.21 \times 10^{-2}$ |
| Cobalt(II) phosphate | $Co_3(PO_4)_2$ | $2.05 \times 10^{-35}$ |
| Cobalt(II) sulfide (alpha) | $CoS$ | $5 \times 10^{-22}$ |
| Cobalt(II) sulfide (beta) | $CoS$ | $3 \times 10^{-26}$ |
| Copper(I) bromide | $CuBr$ | $6.27 \times 10^{-9}$ |
| Copper(I) chloride | $CuCl$ | $1.72 \times 10^{-7}$ |
| Copper(I) cyanide | $CuCN$ | $3.47 \times 10^{-20}$ |
| Copper(I) hydroxide | $Cu_2O$ | $2 \times 10^{-15}$ |
| Copper(I) iodide | $CuI$ | $1.27 \times 10^{-12}$ |
| Copper(I) thiocyanate | $CuSCN$ | $1.77 \times 10^{-13}$ |
| Copper(II) arsenate | $Cu_3(AsO_4)_2$ | $7.95 \times 10^{-36}$ |
| Copper(II) hydroxide | $Cu(OH)_2$ | $4.8 \times 10^{-20}$ |
| Copper(II) iodate monohydrate | $Cu(IO_3)_2 \times H_2O$ | $6.94 \times 10^{-8}$ |
| Copper(II) oxalate | $CuC_2O_4$ | $4.43 \times 10^{-10}$ |
| Copper(II) phosphate | $Cu_3(PO_4)_2$ | $1.40 \times 10^{-37}$ |
| Copper(II) sulfide | $CuS$ | $8 \times 10^{-37}$ |
| Europium(III) hydroxide | $Eu(OH)_3$ | $9.38 \times 10^{-27}$ |
| Gallium(III) hydroxide | $Ga(OH)_3$ | $7.28 \times 10^{-36}$ |
| Iron(II) carbonate | $FeCO_3$ | $3.13 \times 10^{-11}$ |
| Iron(II) fluoride | $FeF_2$ | $2.36 \times 10^{-6}$ |
| Iron(II) hydroxide | $Fe(OH)_2$ | $4.87 \times 10^{-17}$ |
| Iron(II) sulfide | $FeS$ | $8 \times 10^{-19}$ |
| Iron(III) hydroxide | $Fe(OH)_3$ | $2.79 \times 10^{-39}$ |
| Iron(III) phosphate dihydrate | $FePO_4 \times 2H_2O$ | $9.91 \times 10^{-16}$ |
| Lanthanum iodate | $La(IO_3)_3$ | $7.50 \times 10^{-12}$ |
| Lead(II) bromide | $PbBr_2$ | $6.60 \times 10^{-6}$ |
| Lead(II) carbonate | $PbCO_3$ | $7.40 \times 10^{-14}$ |
| Lead(II) chloride | $PbCl_2$ | $1.70 \times 10^{-5}$ |
| Lead(II) chromate | $PbCrO_4$ | $3 \times 10^{-13}$ |
| Lead(II) fluoride | $PbF_2$ | $3.3 \times 10^{-8}$ |
| Lead(II) hydroxide | $Pb(OH)_2$ | $1.43 \times 10^{-20}$ |
| Lead(II) iodate | $Pb(IO_3)_2$ | $3.69 \times 10^{-13}$ |
| Lead(II) iodide | $PbI_2$ | $9.8 \times 10^{-9}$ |
| Lead(II) oxalate | $PbC_2O_4$ | $8.5 \times 10^{-9}$ |
| Lead(II) selenate | $PbSeO_4$ | $1.37 \times 10^{-7}$ |
| Lead(II) sulfate | $PbSO_4$ | $2.53 \times 10^{-8}$ |
| Lead(II) sulfide | $PbS$ | $3 \times 10^{-28}$ |
| Lithium carbonate | $Li_2CO_3$ | $8.15 \times 10^{-4}$ |
| Lithium fluoride | $LiF$ | $1.84 \times 10^{-3}$ |
| Lithium phosphate | $Li_3PO_4$ | $2.37 \times 10^{-4}$ |
| Magnesium ammonium phosphate | $MgNH_4PO_4$ | $3 \times 10^{-13}$ |
| Magnesium carbonate | $MgCO_3$ | $6.82 \times 10^{-6}$ |
| Magnesium carbonate trihydrate | $MgCO_3 \times 3H_2O$ | $2.38 \times 10^{-6}$ |
| Magnesium carbonate pentahydrate | $MgCO_3 \times 5H_2O$ | $3.79 \times 10^{-6}$ |
| Magnesium fluoride | $MgF_2$ | $5.16 \times 10^{-11}$ |
| Magnesium hydroxide | $Mg(OH)_2$ | $5.61 \times 10^{-12}$ |
| Magnesium oxalate dihydrate | $MgC_2O_4 \times 2H_2O$ | $4.83 \times 10^{-6}$ |
| Magnesium phosphate | $Mg_3(PO_4)_2$ | $1.04 \times 10^{-24}$ |
| Manganese(II) carbonate | $MnCO_3$ | $2.24 \times 10^{-11}$ |
| Manganese(II) iodate | $Mn(IO_3)_2$ | $4.37 \times 10^{-7}$ |
| Manganese(II) hydroxide | $Mn(OH)_2$ | $2 \times 10^{-13}$ |
| Manganese(II) oxalate dihydrate | $MnC_2O_4 \times 2H_2O$ | $1.70 \times 10^{-7}$ |
| Manganese(II) sulfide (pink) | $MnS$ | $3 \times 10^{-11}$ |
| Manganese(II) sulfide (green) | $MnS$ | $3 \times 10^{-14}$ |
| Mercury(I) bromide | $Hg_2Br_2$ | $6.40 \times 10^{-23}$ |
| Mercury(I) carbonate | $Hg_2CO_3$ | $3.6 \times 10^{-17}$ |
| Mercury(I) chloride | $Hg_2Cl_2$ | $1.43 \times 10^{-18}$ |
| Mercury(I) fluoride | $Hg_2F_2$ | $3.10 \times 10^{-6}$ |
| Mercury(I) iodide | $Hg_2I_2$ | $5.2 \times 10^{-29}$ |
| Mercury(I) oxalate | $Hg_2C_2O_4$ | $1.75 \times 10^{-13}$ |
| Mercury(I) sulfate | $Hg_2SO_4$ | $6.5 \times 10^{-7}$ |
| Mercury(I) thiocyanate | $Hg_2(SCN)_2$ | $3.2 \times 10^{-20}$ |
| Mercury(II) bromide | $HgBr_2$ | $6.2 \times 10^{-20}$ |
| Mercury(II) hydroxide | $HgO$ | $3.6 \times 10^{-26}$ |
| Mercury(II) iodide | $HgI_2$ | $2.9 \times 10^{-29}$ |
| Mercury(II) sulfide (black) | $HgS$ | $2 \times 10^{-53}$ |
| Mercury(II) sulfide (red) | $HgS$ | $2 \times 10^{-54}$ |
| Neodymium carbonate | $Nd_2(CO_3)_3$ | $1.08 \times 10^{-33}$ |
| Nickel(II) carbonate | $NiCO_3$ | $1.42 \times 10^{-7}$ |
| Nickel(II) hydroxide | $Ni(OH)_2$ | $5.48 \times 10^{-16}$ |
| Nickel(II) iodate | $Ni(IO_3)_2$ | $4.71 \times 10^{-5}$ |
| Nickel(II) phosphate | $Ni_3(PO_4)_2$ | $4.74 \times 10^{-32}$ |
| Nickel(II) sulfide (alpha) | $NiS$ | $4 \times 10^{-20}$ |
| Nickel(II) sulfide (beta) | $NiS$ | $1.3 \times 10^{-25}$ |
| Palladium(II) thiocyanate | $Pd(SCN)_2$ | $4.39 \times 10^{-23}$ |
| Potassium hexachloroplatinate | $K_2PtCl_6$ | $7.48 \times 10^{-6}$ |
| Potassium perchlorate | $KClO_4$ | $1.05 \times 10^{-2}$ |
| Potassium periodate | $KIO_4$ | $3.71 \times 10^{-4}$ |
| Praseodymium hydroxide | $Pr(OH)_3$ | $3.39 \times 10^{-24}$ |
| Radium iodate | $Ra(IO_3)_2$ | $1.16 \times 10^{-9}$ |
| Radium sulfate | $RaSO_4$ | $3.66 \times 10^{-11}$ |
| Rubidium perchlorate | $RuClO_4$ | $3.00 \times 10^{-3}$ |
| Scandium fluoride | $ScF_3$ | $5.81 \times 10^{-24}$ |
| Scandium hydroxide | $Sc(OH)_3$ | $2.22 \times 10^{-31}$ |
| Silver(I) acetate | $AgCH_3COO$ | $1.94 \times 10^{-3}$ |
| Silver(I) arsenate | $Ag_3AsO_4$ | $1.03 \times 10^{-22}$ |
| Silver(I) bromate | $AgBrO_3$ | $5.38 \times 10^{-5}$ |
| Silver(I) bromide | $AgBr$ | $5.35 \times 10^{-13}$ |
| Silver(I) carbonate | $Ag_2CO_3$ | $8.46 \times 10^{-12}$ |
| Silver(I) chloride | $AgCl$ | $1.77 \times 10^{-10}$ |
| Silver(I) chromate | $Ag_2CrO_4$ | $1.12 \times 10^{-12}$ |
| Silver(I) cyanide | $AgCN$ | $5.97 \times 10^{-17}$ |
| Silver(I) iodate | $AgIO_3$ | $3.17 \times 10^{-8}$ |
| Silver(I) iodide | $AgI$ | $8.52 \times 10^{-17}$ |
| Silver(I) oxalate | $Ag_2C_2O_4$ | $5.40 \times 10^{-12}$ |
| Silver(I) phosphate | $Ag_3PO_4$ | $8.89 \times 10^{-17}$ |
| Silver(I) sulfate | $Ag_2SO_4$ | $1.20 \times 10^{-5}$ |
| Silver(I) sulfite | $Ag_2SO_3$ | $1.50 \times 10^{-14}$ |
| Silver(I) sulfide | $Ag_2S$ | $8 \times 10^{-51}$ |
| Silver(I) thiocyanate | $AgSCN$ | $1.03 \times 10^{-12}$ |
| Strontium arsenate | $Sr_3(AsO_4)_2$ | $4.29 \times 10^{-19}$ |
| Strontium carbonate | $SrCO_3$ | $5.60 \times 10^{-10}$ |
| Strontium fluoride | $SrF_2$ | $4.33 \times 10^{-9}$ |
| Strontium iodate | $Sr(IO_3)_2$ | $1.14 \times 10^{-7}$ |
| Strontium iodate monohydrate | $Sr(IO_3)_2 \times H_2O$ | $3.77 \times 10^{-7}$ |
| Strontium iodate hexahydrate | $Sr(IO_3)_2 \times 6H_2O$ | $4.55 \times 10^{-7}$ |
| Strontium oxalate | $SrC_2O_4$ | $5 \times 10^{-8}$ |
| Strontium sulfate | $SrSO_4$ | $3.44 \times 10^{-7}$ |
| Thallium(I) bromate | $TlBrO_3$ | $1.10 \times 10^{-4}$ |
| Thallium(I) bromide | $TlBr$ | $3.71 \times 10^{-6}$ |
| Thallium(I) chloride | $TlCl$ | $1.86 \times 10^{-4}$ |
| Thallium(I) chromate | $Tl_2CrO_4$ | $8.67 \times 10^{-13}$ |
| Thallium(I) hydroxide | $Tl(OH)_3$ | $1.68 \times 10^{-44}$ |
| Thallium(I) iodate | $TlIO_3$ | $3.12 \times 10^{-6}$ |
| Thallium(I) iodide | $TlI$ | $5.54 \times 10^{-8}$ |
| Thallium(I) thiocyanate | $TlSCN$ | $1.57 \times 10^{-4}$ |
| Thallium(I) sulfide | $Tl_2S$ | $6 \times 10^{-22}$ |
| Tin(II) hydroxide | $Sn(OH)_2$ | $5.45 \times 10^{-27}$ |
| Yttrium carbonate | $Y_2(CO_3)_3$ | $1.03 \times 10^{-31}$ |
| Yttrium fluoride | $YF_3$ | $8.62 \times 10^{-21}$ |
| Yttrium hydroxide | $Y(OH)_3$ | $1.00 \times 10^{-22}$ |
| Yttrium iodate | $Y(IO_3)_3$ | $1.12 \times 10^{-10}$ |
| Zinc arsenate | $Zn_3(AsO_4)_2$ | $2.8 \times 10^{-28}$ |
| Zinc carbonate | $ZnCO_3$ | $1.46 \times 10^{-10}$ |
| Zinc carbonate monohydrate | $ZnCO_3 \times H_2O$ | $5.42 \times 10^{-11}$ |
| Zinc fluoride | $ZnF$ | $3.04 \times 10^{-2}$ |
| Zinc hydroxide | $Zn(OH)_2$ | $3 \times 10^{-17}$ |
| Zinc iodate dihydrate | $Zn(IO_3)_2 \times 2H_2O$ | $4.1 \times 10^{-6}$ |
| Zinc oxalate dihydrate | $ZnC_2O_4 \times 2H_2O$ | $1.38 \times 10^{-9}$ |

TABLE 4-continued

Solubility Products of Various Compounds

| Compound | Formula | $K_{sp}$ (25° C.) |
|---|---|---|
| Zinc selenide | ZnSe | $3.6 \times 10^{-26}$ |
| Zinc selenite monohydrate | ZnSexH$_2$O | $1.59 \times 10^{-7}$ |
| Zinc sulfide (alpha) | ZnS | $2 \times 10^{-25}$ |
| Zinc sulfide (beta) | ZnS | $3 \times 10^{-23}$ |

Conventional descaling technologies include chemical and electromagnetic methods. Chemical methods utilize either pH adjustment, chemical sequestration with polyphosphates, zeolites and the like, or ionic exchange; combinations of these methods are typically used. Normally, chemical methods aim at preventing scale from precipitating by lowering the pH and using chemical sequestration, but they are typically not 100% effective. Electromagnetic methods rely on the electromagnetic excitation of calcium or magnesium carbonate so as to favor crystallographic forms that are non-adherent. For example, electromagnetic excitation favors the precipitation of aragonite rather than calcite; the former is a softer, less adherent form of calcium carbonate. However, electromagnetic methods are only effective over relatively short distances and residence times. There is a need for permanently removing scale-forming constituents from contaminated aqueous solutions, seawater, or produced waters that will be subject to be further processing.

Other factors can complicate scale reduction methods, particularly in high-salinity solutions such as seawater or produce water. These include the buffering effects of high ionic strength solutions and ion complexing phenomena that can shield certain cations from reacting.

An embodiment of the present invention provides a method for removing scale-forming compounds from tap water, contaminated aqueous solutions, seawater, and saline brines such as produced water, involving the initial removal of magnesium ions by precipitating magnesium hydroxide ($Mg(OH)_2$) at high pH, then removing the precipitate by either sedimentation or filtering. Ordinarily, $Mg(OH)_2$ precipitates at high pH (around 11.0), although in many cases the bulk of magnesium precipitates at lower pH.

Following $Mg(OH)_2$ precipitation, carbonate ions are added in the form of $CO_2$ sparging, by adding soluble carbonate or bicarbonate salts in nearly stoichiometric amounts so as to subsequently precipitate calcium, barium, and other divalent cations as carbonates by adjusting the pH to about 10.2 or greater. This process has the net effect of permanently sequestering $CO_2$ from the atmosphere, and the precipitates are then removed by either sedimentation or filtering.

A detailed description of this pre-treatment embodiment follows the flowsheet of FIG. 1. In FIG. 1, filtered and de-oiled contaminated water (1) enters the pretreatment system through a line-booster pump P101 (20), which delivers the incoming water into a mixer-settler vessel V-101 (40). The pH of vessel V-101 is maintained at about 11 by means of continuous alkali additions, in the form of sodium hydroxide, calcium hydroxide, or similar chemical. Control of the pH in vessel V-101 is achieved through a metering pump P102 (22), which transfers caustic solution from tank T101 through a variable valve Va101 (45). The precipitated $Mg(OH)_2$ slurry in vessel V101 sediments and exits near the bottom and is continuously filtered in filter F101 (50), thus yielding a filter cake (66) of magnesium hydroxide.

Following precipitation of $Mg(OH)_2$ in vessel V101 (40), the clear solution exits near the top and flows into a static mixer M101 (60), where it is mixed with additional clear filtrate from filter F101 (50) and pump P103 (24) and a source of carbonate ions, which can be pressurized $CO_2$ gas from V102 (32) or a solution of soluble carbonates or bicarbonates.

The aqueous solution then flows into a second static mixer M102, where additional caustic or alkali chemicals are added from the variable valve Va101 (45) so as to adjust the pH to about 10.2, at which point most of the divalent cations in solution precipitate as insoluble carbonates. The precipitate slurry then enters mixer-settler V103 (42), where the insoluble carbonates sediment and flow into filter F102 (52), where a second filter cake (68) is removed. The filtrate from filter F102 enters pump P105 (26), which feeds a variable valve Va102 (47) that allows a portion of the descaled water product (70) to recirculate back into the carbonation loop.

In a further aspect, especially when the contaminated water contains excess carbonate or bicarbonate ions, calcium or magnesium can be added in order to provide the stoichiometric requirements for carbonate precipitation. Alternatively, calcium and magnesium can be substituted for other divalent cations, such as barium, cadmium, cobalt, iron, lead, manganese, nickel, strontium, or zinc, that have low solubility products in carbonate form.

In a further aspect, calcium or magnesium additions are substituted for trivalent cations, such as aluminum or neodymium, that have low solubility products in their carbonate or hydroxide forms.

In a further aspect, $CO_2$ sparging is replaced by the addition of soluble bicarbonate ions, such as sodium, potassium, or ammonium bicarbonate.

In a further aspect, carbonate and scale precipitates are removed by means other than sedimentation or filtering, such as centrifuging.

In a further aspect, the permanent sequestration of $CO_2$ from the atmosphere is achieved in conventional desalination systems, such as MSF evaporation systems, MED plants, and VC desalination systems.

In a further aspect, scale-forming salts are permanently removed from conventional desalination systems.

In a further aspect, tap water, municipal water, or well water containing objectionable hard water constituents, such as calcium or magnesium, are descaled in residential water purification systems.

In a further aspect, valuable scale-forming salts, such as magnesium, barium, and other salts, are recovered.

In a further aspect, scale-forming compounds are precipitated in the form of non-adhering, easily filterable or sedimentable solids and ultimately removed.

In a further aspect, $CO_2$ emissions from power plants and similar flue gases are permanently sequestered.

In a further aspect, scale-forming compounds are sequentially precipitated and removed, so they can be utilized and reused in downstream industrial processes.

A further embodiment of the present invention provides a method for removing a scale-forming compound from an aqueous solution, involving: adding at least one ion to the solution in a stoichiometric amount sufficient to cause the precipitation of a first scale-forming compound at an alkaline pH; adjusting the pH of the solution to an alkaline pH, thereby precipitating the first scale-forming compound; removing the first scale-forming compound from the solution; heating the solution to a temperature sufficient to cause the precipitation of a second scale-forming compound from the solution; and removing the second scale-forming compound from the solution.

In a further aspect, the ion is selected from the group including carbonate ions and divalent cations. In a further aspect, the carbonate ion is $HCO_3^-$. In a further aspect, the divalent cation is selected from the group including $Ca^{2+}$ and $Mg^{2+}$.

In a further aspect, the stoichiometric amount is sufficient to substitute the divalent cation for a divalent cation selected from the group including barium, cadmium, cobalt, iron, lead, manganese, nickel, strontium, and zinc in the first scale-forming compound.

In a further aspect, the stoichiometric amount is sufficient to substitute the divalent cation for a trivalent cation selected from the group including aluminum and neodymium in the first scale-forming compound.

In a further aspect, adding at least one ion comprises sparging the solution with $CO_2$ gas.

In a further aspect, the $CO_2$ is atmospheric $CO_2$.

In a further aspect, adding at least one ion comprises adding a soluble bicarbonate ion selected from the group including sodium bicarbonate, potassium bicarbonate, and ammonium bicarbonate to the solution.

In a further aspect, adding at least one ion comprises adding a compound selected from the group including CaO, $Ca(OH)_2$, $Mg(OH)_2$, and MgO to the solution.

In a further aspect, the alkaline pH is a pH of approximately 9.2 or greater.

In a further aspect, the first scale-forming compound is selected from the group including $CaCO_3$ and $MgCO_3$.

In a further aspect, adjusting the pH of the solution comprises adding a compound selected from the group including CaO and NaOH to the solution.

In a further aspect, removing the first scale-forming compound comprises at least one of filtration, sedimentation, and centrifuging.

A further embodiment of the present invention provides a method of obtaining scale-forming compounds, involving: providing an aqueous solution; adding alkali chemicals in amounts sufficient to cause the precipitation of a first scale-forming compound at an alkaline pH; adjusting the pH of the solution to an alkaline pH, thereby precipitating the first scale-forming compound; removing the first scale-forming compound from the solution; adding carbonate ions while maintaining an alkaline pH sufficient to cause the precipitation of a second scale-forming compound from the solution; removing the second scale-forming compound from the solution; recovering the first scale-forming compound; and recovering the second scale-forming compound.

In a further aspect, the first and second scale-forming compounds are selected from the group of compounds listed in Table 4.

A further embodiment of the present invention provides a method of sequestering atmospheric $CO_2$, involving: providing an aqueous solution containing at least one ion capable of forming a $CO_2$-sequestering compound in the presence of carbonate ion; adding carbonate ions to the solution in a stoichiometric amount sufficient to cause the precipitation of the $CO_2$-sequestering compound at an alkaline pH; adjusting the pH of the solution to an alkaline pH, thereby precipitating the $CO_2$-sequestering compound; and removing the $CO_2$-sequestering compound from the solution; wherein adding carbonate ions comprises adding either atmospheric or concentrated $CO_2$ (e.g., from a combustion flue gas) to the solution, and wherein the $CO_2$ is sequestered in the $CO_2$-sequestering compound.

Overall Description of Water Desalination System

In preferred embodiments, such as those shown in FIG. 2, the water purification and desalination system consists of a vertically stacked arrangement of boilers (92 and 96) and condensers (90, 94, and 98), whereby a source of heat is provided at the bottom of the stack, a preheater (74) is provided at the top of the stack, a degasser (80) is provided at the top of the system to remove volatile organic compounds from the incoming water, a plurality of demisters (not shown) are provided to remove contaminated mist particles from each boiling chamber, a plurality of heat pipes (78) is provided to recover heat from each condenser and transfer such heat to an upper boiling chamber, and a waste stream outlet (100) is provided to remove and drain water contaminants. Various alternative configurations to the vertical stacked arrangement are possible to those skilled in the art, such as, for example, a lateral arrangement of boilers, condensers, and preheaters, and the like.

In FIG. 2, pre-treated water (70) enters the desalinator proximate the upper end of the stack through a pipeline (72), which delivers the flow into a preheater tank (74). A number of heat pipes (78) in the preheater tank (74) deliver the heat to preheat the incoming water by transferring the heat of condensation from the condenser (90) that is placed immediately below. The preheated water exits the preheater tank (74) through a pipe (76), which delivers the preheated water into the upper end of a degasser (80), where it flows by gravity downward while a counter current of steam flows upward from the boiler (92) through the bottom of the degasser (80). As steam strips organic contaminants and gases from the preheated water, the degassed water exits the degasser (80) and enters the boiler (92).

Preheated and degassed water that enters the boiler (92) is further heated by heat pipes (78) that transfer the heat of condensation from a condenser (94). The steam produced in the boiler (92) is cleaned in a demister that is described below and is condensed in a condenser (90), and the clean water product exits the system via a pipe (102), which collects clean water product from each condenser. As water is evaporated from the boiler (92), the concentration of dissolved salts increases. The level of boiling water in the boiler (92) is maintained at a constant level by a downcomer tube (101), which allows water to exit the boiler by gravity.

An important element in the vertical arrangement of boilers and condensers is the ability to maintain a slight pressure differential between boilers, so that a lower boiler will have a slightly higher pressure than an upper boiler; therefore, the temperature of the lower boiler will be slightly higher than that of an upper boiler. This pressure differential can be maintained by a pump, but, in a preferred embodiment, it is simply maintained by the hydraulic head of the downcomer tubes (100) and (101), which maintain such pressure differential by means of a lower pressure-actuated valve (103).

A more detailed description of the vertical arrangement of boilers and condensers is provided in FIG. 3. In FIG. 3, the boiler (92) receives hot incoming water from the downcomer tube (101), which either drains an upper boiler or receives water from the degasser. In the boiler (92), the heat pipes (78) transfer the necessary heat to bring the temperature to the boiling point and provide the heat of evaporation to transform part of the boiling water into steam. The steam that is produced enters a demister (110), where mist particles are collected by a series of mechanical barriers that allow only clean steam to enter a steam tube (115), which delivers such steam to an upper condenser chamber (90), where it condenses into clean water product that drains through the product water drain (102).

As water boils in the boiler (92), it becomes denser and more concentrated in soluble salts and exits through the downcomer tube (100) into a lower boiler (96). A valve (103) at the bottom of the downcomer tube (100) provides the necessary hydraulic pressure to maintain the lower boiler (96) at a slightly higher pressure and, thus, at a slightly higher temperature than the upper boiler (92).

The tubes (120) and (130) and the intermediate valve (125) serve dual functions. During start-up procedures, the valve (125), which can be controlled by a pressure regulator or a solenoid, is open, allowing steam to travel directly from the lower boiler (96) to the upper boiler (92), thus accelerating start-up procedures. Once the system is operating at the correct temperature, the valve (125) is closed. During shutdown procedures, the heat source is shut off, and the valve (125) is re-opened so as to facilitate draining of all the boilers.

FIG. 4 is a diagram of a desalinator with five vertical stages. In FIG. 4, pre-treated and descaled water (70) enters through a tube (72) into an upper preheater vessel (74), where heat from heat pipes (78) provide the necessary energy for preheating the incoming water close to its boiling point but no less than 96° C. The preheated water exits the preheater (74) and enters the degasser (80), where countercurrent steam strips the gases and organic contaminants. The degassed water then flows into an upper boiler (92), where the heat pipes provide the necessary heat for turning a portion of the incoming water into steam. Some of the steam produced in the upper boiler (92) may be used to provide the steam for degassing, while the rest flows into the demister (110) and subsequently into an upper condenser (90), where it condenses into pure product water. As water evaporates in the upper boiler (92), it becomes more concentrated in soluble salts and flows by gravity into a lower boiler via the downcomer tube (100). The boiler water becomes progressively more concentrated in soluble salts as it travels downward from boiler to boiler until it reaches the lowest boiler, where it exits the system as a concentrated hot brine that can begin crystallizing as soon as it cools down. In the case of desalination, the hot waste brine may have a TDS concentration on the order of 250,000 ppm; this concentration is still lower than the solubility limit of NaCl but is close enough to begin crystallization upon cooling.

In contrast with water flow, heat travels upward in the system, from the heat input vessel at the bottom (150) ultimately to the preheating vessel at the top (74), by means of multiple stages of heat pipes (78). At each stage, the heat of condensation or, in the case of the heat input vessel at the bottom (150), the latent heat of flue gases or the heat of condensation of waste steam, is absorbed by a series of heat pipes that transfer the heat to an upper boiler and, at the top of the vertical stack, to the upper preheating tank (74).

An important advantage of the system described herein is the mechanism of heat transfer via heat pipes. As shown in a subsequent section, heat pipes provide a means of transferring heat that is nearly thermodynamically reversible, that is, a system that transfers enthalpy with almost no losses in efficiency. Thus, with the exception of the preheating energy, nearly all of the heat provided by the heat input vessel at the bottom (150) is re-used at each of the boiling and condensing stages by minimizing heat losses at the wall separating the condensing side of the heat pipe from the boiling side. Since that distance is defined by the perforated plate (93), which can be very thin or made as an insulator, the amount of heat lost during heat transfer can be close to zero. Therefore, the energy used during multiple stages of boiling and condensing can be readily approximated by dividing the heat of evaporation of water by the number of stages of the system.

However, as the number of stages in the system increases, the amount of steam produced at each stage decreases; with a large number of stages, the amount of heat that condenses at the upper condenser is insufficient to provide the necessary heat for preheating the incoming water and also insufficient for providing the necessary steam required for degassing. Table 5 illustrates these energy requirements for the case of seawater, which is normally devoid of organic contaminants, as a function of the number of stages in the system, but ignoring degassing requirements.

TABLE 5

| Energy Requirements, Kwh/m$^3$ | |
| --- | --- |
| Stages | Total heat |
| 5 | 133.4693 |
| 6 | 111.2245 |
| 7 | 95.33525 |
| 8 | 86.67204 |
| 10 | 69.98837 |
| 20 | 36.62103 |
| 30 | 25.49859 |
| 40 | 19.93736 |
| 50 | 16.60063 |

The above estimates presume that the heat available in the hot waste brine at the bottom of the system and the heat contained in the various product water streams is recovered either by means of heat exchangers or heat pipes. In a simple arrangement, most of this heat can be recovered by preheating the incoming water in exchange with each of the product streams as they cascade downward in a vertical system, ending with heat recovery from the waste brine, and then re-pumping this preheated water to the top of the system, where a minimal amount of supplemental heat is required to bring the temperature up to the boiling point.

In alternative embodiments, the product water at each stage can be re-introduced into an upper condenser stage and allowed to flash, thus releasing part of the contained heat. In other embodiments, the incoming pre-treated water can be divided into separate streams and introduced into each separate stage for distillation.

FIG. 5 illustrates plant, stereoscopic, and elevation views of a typical stage and provides dimensions for a boiler, condenser, and separator plate suitable for a system able to process on the order of 100,000 gpd (378.5 m$^3$/day) in 6 stages.

It is advantageous to be able to maximize the number of boiling and condensing stages in the present invention. This is possible through the use of heat pipes, provided the temperature difference between the condensing and boiling ends of such a heat pipe (the $\Delta T$) is sufficient to maintain the maximum heat flux through the heat pipe. Commercially available heat pipes typically have $\Delta T$s of the order of 8° C. (15° F.), although some have $\Delta T$s as low as 3° C. The $\Delta T$ defines the maximum number of stages that are practical with a given amount of heat available at a given temperature. Thus, there is a need for heat pipes that can function with as small a $\Delta T$ as possible. It is therefore useful to examine the thermal phenomena in a heat pipe.

FIG. 6 illustrates a typical commercial heat pipe, which ordinarily consists of a partially evacuated and sealed tube (77) containing a small amount of a working fluid (81); this fluid is typically water but may also be an alcohol or other volatile liquid. When heat is applied to the lower end in the form of enthalpy, the heat crosses the metal barrier of the tube (77), then is used to provide the heat of vaporization to the working fluid (81). As the working fluid evaporates, the resulting gas (which is steam in the case of water) fills the tube (77) and reaches the upper end, where the ΔT causes condensation and release of the same heat as the heat of condensation. To facilitate continuous operation, the inside of the tube (77) normally includes a wick (79), which can be any porous and hydrophilic layer that transfers the condensed phase of the working fluid back to the hot end of the tube.

Experimentally, the largest barriers to heat transfer in a heat pipe include: 1) the layer immediately adjacent to the outside of the heat pipe, 2) the conduction barrier presented by the material of the heat pipe, and 3) the limitation of the wick material to return working fluid to the hot end of the heat pipe. FIG. 7 illustrates a high-performance heat pipe that minimizes these barriers.

In FIG. 7, vibrational energy (87) is provided to the heat pipe (78), either in the form of mechanical vibration, electromechanical vibration, or high-frequency ultrasound. This vibration is transmitted to the length of the heat pipe and disrupts the layer adjacent to the heat pipe. Disruption of this layer facilitates micro-turbulence in the layer, thus resulting in heat transfer. In addition, a hydrophobic coating is provided on the outside of the heat pipe, especially in the area where external condensation occurs. The hydrophobic coating may consist of a monolayer of stearic acid or similar hydrocarbon, or it may be a thin layer of a hydrophobic chlorofluorocarbon. A hydrophobic surface on the outside of the heat pipe minimizes the area required for condensation and evaporation, thus reducing the barrier for heat transfer.

The heat conduction barrier is also minimized by using a very thin metal foil (77) instead of the solid metal tube of most heat pipes. Mechanical support for the metal foil must be sufficient to sustain moderate vacuum and is provided by a metal screen (85), which provides additional functionality by increasing the internal surface area required for providing the necessary heat of condensation/evaporation.

An improved distribution of working fluid is achieved by orienting the wick toward the axis of the heat pipe, thus reducing the thermal interference of condensate with heat transfer across the wall of the heat pipe. The wick material can be any hydrophilic porous medium that can transfer working fluid by capillary action, such as metallic oxides, some ceramics, surface-treated cellulosic materials, and the like.

In some embodiments, the system for descaling water and saline solutions, embodiments of which are disclosed herein, can be combined with other systems and devices to provide further beneficial features. For example, the system can be used in conjunction with any of the devices or methods disclosed in U.S. Provisional Patent Application No. 60/676,870, entitled SOLAR ALIGNMENT DEVICE, filed May 2, 2005; U.S. Provisional Patent Application No. 60/697,104, entitled VISUAL WATER FLOW INDICATOR, filed Jul. 6, 2005; U.S. Provisional Patent Application No. 60/697,106, entitled APPARATUS FOR RESTORING THE MINERAL CONTENT OF DRINKING WATER, filed Jul. 6, 2005; U.S. Provisional Patent Application No. 60/697,107, entitled IMPROVED CYCLONE DEMISTER, filed Jul. 6, 2005; PCT Application No: US2004/039993, filed Dec. 1, 2004; PCT Application No: US2004/039991, filed Dec. 1, 2004; PCT Application No: US2006/040103, filed Oct. 13, 2006; U.S. patent application Ser. No. 12/281,608, filed Sep. 3, 2008; PCT Application No. US2008/03744, filed Mar. 21, 2008; and U.S. Provisional Patent Application No. 60/526,580, filed Dec. 2, 2003; each of the foregoing applications is hereby incorporated by reference in its entirety.

One skilled in the art will appreciate that these methods and devices are and may be adapted to carry out the objects and obtain the ends and advantages mentioned, as well as various other advantages and benefits. The methods, procedures, and devices described herein are presently representative of preferred embodiments and are exemplary and are not intended as limitations on the scope of the invention. Changes therein and other uses will occur to those skilled in the art which are encompassed within the spirit of the invention and are defined by the scope of the disclosure.

The invention illustratively described herein suitably can be practiced in the absence of any element or elements, limitation or limitations which is not specifically disclosed herein. The terms and expressions which have been employed are used as terms of description and not of limitation, and there is no intention that the use of such terms and expressions indicates the exclusion of equivalents of the features shown and described or portions thereof. It is recognized that various modifications are possible within the scope of the invention disclosed. Thus, it should be understood that although the present invention has been specifically disclosed by preferred embodiments and optional features, modification and variation of the concepts herein disclosed may be resorted to by those skilled in the art and that such modifications and variations are considered to be within the scope of this invention as defined by the disclosure.

Those skilled in the art will recognize that the aspects and embodiments of the invention set forth herein can be practiced separately from each other or in conjunction with each other. Therefore, combinations of separate embodiments are within the scope of the invention as disclosed herein.

All patents and publications are herein incorporated by reference to the same extent as if each individual publication was specifically and individually indicated to be incorporated by reference.

Example #1—Water Descaling System for Seawater

The approximate chemical composition of seawater is presented in Table 6, below, and is typical of open ocean, but there are significant variations in seawater composition depending on geography and/or climate.

TABLE 6

Detailed Composition of Seawater at 3.5% Salinity

| Element | At. Weight | ppm | Element | At. Weight | ppm |
|---|---|---|---|---|---|
| Hydrogen $H_2O$ | 1.00797 | 110,000 | Molybdenum Mo | 95.94 | 0.01 |
| Oxygen $O_2$ | 15.9994 | 883,000 | Ruthenium Ru | 101.07 | 0.0000007 |
| Sodium NaCl | 22.9898 | 10,800 | Rhodium Rh | 102.905 | . |
| Chlorine NaCl | 35.453 | 19,400 | Palladium Pd | 106.4 | . |
| Magnesium Mg | 24.312 | 1,290 | Silver Ag | 107.870 | 0.00028 |

TABLE 6-continued

Detailed Composition of Seawater at 3.5% Salinity

| Element | At. Weight | ppm | Element | At. Weight | ppm |
|---|---|---|---|---|---|
| Sulfur S | 32.064 | 904 | Cadmium Cd | 112.4 | 0.00011 |
| Potassium K | 39.102 | 392 | Indium In | 114.82 | . |
| Calcium Ca | 10.08 | 411 | Tin Sn | 118.69 | 0.00081 |
| Bromine Br | 79.909 | 67.3 | Antimony Sb | 121.75 | 0.00033 |
| Helium He | 4.0026 | 0.0000072 | Tellurium Te | 127.6 | . |
| Lithium Li | 6.939 | 0.170 | Iodine I | 166.904 | 0.064 |
| Beryllium Be | 9.0133 | 0.0000006 | Xenon Xe | 131.30 | 0.000047 |
| Boron B | 10.811 | 4.450 | Cesium Cs | 132.905 | 0.0003 |
| Carbon C | 12.011 | 28.0 | Barium Ba | 137.34 | 0.021 |
| Nitrogen ion | 14.007 | 15.5 | Lanthanum La | 138.91 | 0.0000029 |
| Fluorine F | 18.998 | 13 | Cerium Ce | 140.12 | 0.0000012 |
| Neon Ne | 20.183 | 0.00012 | Prasodymium Pr | 140.907 | 0.00000064 |
| Aluminum Al | 26.982 | 0.001 | Neodymium Nd | 144.24 | 0.0000028 |
| Silicon Si | 28.086 | 2.9 | Samarium Sm | 150.35 | 0.00000045 |
| Phosphorus P | 30.974 | 0.088 | Europium Eu | 151.96 | 0.0000013 |
| Argon Ar | 39.948 | 0.450 | Gadolinium Gd | 157.25 | 0.0000007 |
| Scandium Sc | 44.956 | <0.000004 | Terbium Tb | 158.924 | 0.00000014 |
| Titanium Ti | 47.90 | 0.001 | Dysprosium Dy | 162.50 | 0.00000091 |
| Vanadium V | 50.942 | 0.0019 | Holmium Ho | 164.930 | 0.00000022 |
| Chromium Cr | 51.996 | 0.0002 | Erbium Er | 167.26 | 0.00000087 |
| Manganese Mn | 54.938 | 0.0004 | Thulium Tm | 168.934 | 0.00000017 |
| Iron Fe | 55.847 | 0.0034 | Ytterbium Yb | 173.04 | 0.00000082 |
| Cobalt Co | 58.933 | 0.00039 | Lutetium Lu | 174.97 | 0.00000015 |
| Nickel Ni | 58.71 | 0.0066 | Hafnium Hf | 178.49 | <0.000008 |
| Copper Cu | 63.54 | 0.0009 | Tantalum Ta | 180.948 | <0.0000025 |
| Zinc Zn | 65.37 | 0.005 | Tungsten W | 183.85 | <0.000001 |
| Gallium Ga | 69.72 | 0.00003 | Rhenium Re | 186.2 | 0.0000084 |
| Germanium Ge | 72.59 | 0.00006 | Osmium Os | 190.2 | . |
| Arsenic As | 74.922 | 0.0026 | Iridium Ir | 192.2 | . |
| Selenium Se | 78.96 | 0.0009 | Platinum Pt | 195.09 | . |
| Krypton Kr | 83.80 | 0.00021 | Gold Au | 196.967 | 0.000011 |
| Rubidium Rb | 85.47 | 0.120 | Mercury Hg | 200.59 | 0.00015 |
| Strontium Sr | 87.62 | 8.1 | Thallium Tl | 204.37 | . |
| Yttrium Y | 88.905 | 0.000013 | Lead Pb | 207.19 | 0.00003 |
| Zirconium Zr | 91.22 | 0.000026 | Bismuth Bi | 208.980 | 0.00002 |
| Niobium Nb | 92.906 | 0.000015 | Thorium Th | 232.04 | 0.0000004 |
|  |  |  | Uranium U | 238.03 | 0.0033 |
|  |  |  | Plutonium Pu | (244) | . |

Note:
ppm = parts per million = mg/liter = 0.001 g/kg

Fifty gallons of ocean seawater were collected and treated in a pilot facility able to continuously handle from 20 to 200 gallons/day. Initially, 50 mL/liter of a 10% sodium hydroxide (caustic) solution was used to raise the pH of the seawater to approximately 11.2 and the resulting precipitate allowed to sediment in a thickener prior to filtering using a 1μ pore filter. The filtrate was then conditioned with 0.9 g/liter of sodium bicarbonate, and the pH was adjusted to 10.2 so as to obtain another precipitate of carbonate salts, which was again allowed to sediment and was subsequently filtered using a micron filter. Chemical analysis of the final filtrate showed a reduction of about 67% of the scale-forming ions, such as calcium and magnesium, with the balance of calcium and magnesium forming soluble chlorides that do not precipitate upon boiling.

In a similar experiment, one liter of ocean seawater was treated with 30 mL of a 10% sodium hydroxide (caustic) solution was used to raise the pH of the seawater to slightly less than 11.0 and the resulting precipitate allowed to sediment in a thickener prior to filtering using a 1μ pore filter. The filtrate was then conditioned with 0.9 g/liter of sodium bicarbonate, and the pH was adjusted to 9.8 by adding another 0.7 g of caustic solution so as to obtain a precipitate of carbonate salts which was allowed to sediment and was subsequently filtered using a 1μ filter. No scale formation compounds were detected in the resulting filtrate.

A special test procedure was developed for ascertaining the degree of descaling in treated solutions. In this test, a sample of treated solution is collected in a glass beaker, and the sample is subjected to boiling in a pressure cooker for up to 5 hours at temperatures of 120° C. under pressure. Following this test procedure, the sample is removed and inspected visually as well as under a microscope to detect any solid precipitate. Since the residence time in the desalinating section that follows is only a couple of hours, the absence of any scale in this particular test proves that no scale will form during desalination. In none of the examples described herein was any scale detected after pre-treatment.

Example #2—Removal of Scale in Treatment of Waste Influent Compositions

An aqueous waste influent composition obtained as a waste stream from a fertilizer processing facility was treated in the manner described above in order to remove scale-forming compounds, as a pre-treatment to eventual desalination of the product in a separate water purification apparatus in which the formation of scale would be highly undesirable. The throughput of the treatment apparatus was 6 gallons per day (GPD), which was used a pilot apparatus for testing an industrial situation requiring 2000 m³/day (528,401.6 GPD). The composition of the waste influent with respect to relevant elements and ions is given in Table 7 below.

TABLE 7

Waste Influent Composition

| Soluble Salts | ppm (mg/L) |
| --- | --- |
| Barium | 0 |
| Calcium | 500 |
| Magnesium | 300 |
| Iron (III) | 2 |
| Bicarbonate | |
| Sulfate | 800 |
| Phosphate | 0 |
| Silica | 50 |
| Strontium | |
| Sodium | 700 |
| Potassium | 30 |
| Arsenic | 0 |
| Fluoride | 2 |
| Chloride | 1000 |
| Nitrate | 10 |

The waste influent had a TDS content of 35,000 ppm (mg/L). As can be seen from Table 7, the waste influent had particularly high concentrations of calcium and magnesium, which tend to give rise to scale.

The waste influent was processed in the manner described above. Because the influent contained little or no hydrocarbons, deoiling and degassing were not conducted. $CO_2$ carbonation and addition of NaOH (to provide hydroxide ions to react with the Mg in solution) were followed by pH adjustment to a pH of 9.3 using additional NaOH. The process resulted in a filtered scale-forming composition ("filter cake") and an effluent (product). The effluent product was tested for scale formation according to the procedure described above, and no scale or precipitate was detected.

Example #3—Removal of Scale in Treatment of Produced Water

The treatment process of the present disclosure was applied to seawater that had been adjusted to a high level of TDS and a high degree of water hardness, in order to test the capacity of the process to deal with such input solutions as produced water from oil extraction operations or waste water from gas fracking operations. The water was pre-treated using the process of the present disclosure before being purified in a water desalination apparatus such as that described in U.S. Pat. No. 7,678,235. As discussed in greater detail below, the seawater subjected to the pretreatment process of the present disclosure showed no formation of scale when used as feed water in the water purification apparatus.

The following amounts of various compounds were added to fresh ocean water to produce the input aqueous solution of the present example: 7 grams/liter of $Ca(OH)_2$ were added to produce a target $Ca^{2+}$ concentration of 7.1 kppm, and 29 grams/liter of NaCl were also added. The TDS of the resulting water sample was 66 kppm.

A first precipitation was conducted at room temperature by adding approximately grams/liter of NaOH as necessary to increase the pH of the solution to greater than 10.5. A milky precipitate containing mainly magnesium hydroxide was precipitated in this first room temperature procedure. The water was filtered to remove the solid precipitates.

A second precipitation was then conducted by adding sodium bicarbonate and sufficient caustic to adjust the pH to 9.8, and a second precipitate containing mainly calcium and other carbonates was obtained. The TDS of the descaled and filtered water was approximately 65 kppm.

The descaled water was used as an influent for a water purification apparatus in accordance with U.S. Pat. No. 7,678,235. The product water was collected from the apparatus, and the TDS of the product water was measured. While the inlet water had a TDS of 65 kppm, the product water of the water purification apparatus was less than 10 ppm. No appreciable development of scale was observed in the boiler of the apparatus.

Example #4—Desalination of Ocean Water

Fifty gallons of ocean water were first pre-treated according to the procedures described earlier and fed into a pilot desalinator designed for a 50-200 GPD throughput. The product water had a TDS of less than 10 ppm, and no signs of scale formation were detected in any of the boilers.

Example #5—Desalination of Produced Water

Fifty gallons of a synthetic produced water containing in excess of 146,000 ppm of TDS and significant alkalinity were first pre-treated according to the procedures described earlier and fed into a pilot desalinator designed for a 50-200 GPD throughput. The product water had a TDS of less than 40 ppm, and no signs of scale formation were detected in any of the boilers.

Example #6—Desalination of Brackish Water

Fifty gallons of brackish water containing in excess of 3,870 ppm of TDS were first pre-treated according to the procedures described earlier and fed into a pilot desalinator designed for a 50-200 GPD throughput. The product water had a TDS of less than 10 ppm, and no signs of scale formation were detected in any of the boilers.

What is claimed is:

1. A water purification system comprising a series of vessel assemblies for heat transfer and recovery,
   wherein each vessel assembly forms a single stage comprising a condenser, a separator plate with sealed heat pipes, and a boiler or evaporation-chamber, wherein the single stage is contained by a top and a bottom not shared with any other stages,
   wherein the series of vessel assemblies comprises at least a first stage comprising a heat input vessel and a first boiler or evaporation chamber; and a second stage comprising a first condenser, a first separator plate with heat pipes, and a second boiler or evaporation chamber, wherein the separator plate is between the first condenser and the second boiler or evaporation chamber, with the heat pipes extending through the separator plate from within the condenser to within the boiler or evaporation chamber;
   wherein the system is configured so that contaminated water enters the first boiler or evaporation chamber and is boiled to create steam, wherein the steam enters the first condenser and is condensed on the heat pipes to create a condensed steam, wherein the heat pipes recover a heat of condensation from the condensed steam and transfer the heat of condensation to contaminated water in the second boiler or evaporation chamber, wherein the condensed steam is collected as product water;
   wherein the system reduces one or more contaminants from a contaminated water sample, while transferring or recovering energy of distillation once or multiple times by means of the heat pipes.

2. A method of purifying water, the method comprising subjecting a volume of water to the water purification system of claim 1 wherein the system further comprises a pre-treatment section which removes or inhibits scale-forming compounds, wherein said pretreatment section being operable for removing or inhibiting scale-forming compounds.

3. The method of claim 2 wherein removal of scale-forming compounds from an aqueous solution comprises:
adding at least one ion selected from the group of chemicals consisting of sodium hydroxide, potassium hydroxide, calcium hydroxide, and similar hydroxides to the solution in a first stoichiometric amount sufficient to cause a precipitation of a first scale-forming compound;
adjusting the pH of the solution to an alkaline pH between 10.5 and 11.0 to precipitate the first scale-forming compound;
removing the first scale-forming compound from the solution;
adding a second ion in a second stoichiometric amount to the solution selected from the group consisting of carbonate, bicarbonate, and solubilized $CO_2$, or a divalent cation selected from the group consisting of calcium, magnesium, barium, cadmium, cobalt, iron, lead, manganese, nickel, strontium, and zinc while adjusting the pH to an alkaline pH to cause a precipitation of other scale-forming compounds;
and removing other scale-forming compounds from the solution.

4. The method of claim 3, wherein the first stoichiometric amount is sufficient to substitute a trivalent cation selected from the group consisting of aluminum and neodymium for the second ion in the first scale-forming compound, and wherein adding a second ion comprises sparging the solution with $CO_2$ gas or atmospheric $CO_2$, or adding a soluble carbonate or bicarbonate ion selected from the group consisting of sodium carbonate, sodium bicarbonate, potassium bicarbonate, and ammonium bicarbonate to the solution.

5. The method of claim 3, wherein the precipitation of other scale forming compounds is carried out at a pH of 9.8 to 10.0, and wherein the other scale-forming compounds comprise an insoluble carbonate compound, and wherein removing scale-forming compounds comprises at least one of filtration, sedimentation, and centrifuging.

6. The method of claim 3, additionally comprising, prior to adding the at least one ion, removing contaminants from the solution, and wherein the contaminants are selected from the group consisting of solid particles and hydrocarbon droplets, and wherein the aqueous solution is selected from the group consisting of tap water, contaminated aqueous solutions, seawater, and saline brines contaminated with hydrocarbons.

7. A method of obtaining scale-forming compounds, comprising:
providing an aqueous solution;
carrying out the method of claim 3:
recovering the first scale-forming compound; and
recovering the second scale-forming compound;
wherein the first and second scale-forming compounds are selected from the group of compounds listed in Table 4.

8. An apparatus for use with the system of claim 1 for removing a scale-forming compound from an aqueous solution, comprising:
an inlet for the aqueous solution;
a source of caustic solution for pH adjustment, selected from the group of NaOH, KOH, $Ca(OH)_2$, ammonium hydroxide, other alkaline hydroxides, other alkaline earth hydroxides, and other metal hydroxides;
a first tank in fluid communication with the inlet and the caustic solution;
a filter in fluid communication with said first tank, wherein the aqueous solution passes out of the first tank and through the filter which is adapted to separate a first scale-forming compound from the aqueous solution in said first tank;
a source of $CO_2$ gas;
a second tank in fluid communication with the source of caustic solution, the source of $CO_2$ gas and the filter from the first tank; and
a second filter in fluid communication with the second tank, wherein the aqueous solution passes out of the second tank and though the filter which is adapted to separate a second scale-forming compound from the aqueous solution in the second tank.

9. The system of claim 1, further comprising an inlet, a waste outlet, one or more product outlets, and a control system, wherein heat of condensation is recovered and reused for evaporation or pre-heating in one or more other stages.

10. The system of claim 9, further comprising a preheating chamber, a degasser, and one or more demisters.

11. The apparatus of claim 8, wherein a soluble carbonate salt or salts are substituted for the $CO_2$.

12. The system of claim 1, wherein a volume of product water produced is between about 20% and about 99% of a volume of input water, and wherein the system does not require cleaning through at least about two months or more of use.

13. The system of claim 9, further comprising:
an inlet device selected from the group consisting of a valve and an aperture to regulate flow of water through the inlet, and wherein the inlet device is controlled by the control system which controls the inlet based upon feedback from at least one of: a temperature sensor in a boiler or evaporation chamber, a level sensor in a boiler or evaporation chamber, a pressure sensor in a boiler or evaporation chamber, a level sensor in a condenser tank, a temperature sensor in a condenser tank, a pressure sensor in a condenser tank, and a flood detector,
a flow controller, and wherein the flow controller comprises a pressure regulator which maintains water pressure between about 0 kPa and 700 kPa (0 to 100 psi), and
a shutdown control selected from the group consisting of: a manual control, a flood control, a condenser tank capacity control, a boiler or evaporation chamber capacity control, and a boiler or evaporation chamber capacity control.

14. The system of claim 10, wherein water exiting the preheating chamber has a temperature higher than 90° C.,
the degasser is in a counter current design orientation, having a first end and a second end,
the heated water from the preheating chamber enters the degasser proximate to the first end and the heated water exits the degasser proximate to the second end, steam from the boiler or evaporation chamber, or other degassing medium, enters the degasser proximate to the second end and the degasser waste stream exits the degasser proximate to the first end, and
the degasser comprises a matrix adapted to facilitate mixing of water and steam, or other degassing media, wherein the matrix comprises either substantially spherical particles, non-spherical particles or filling materials and topographies used for good contact between gaseous and liquid phases.

15. The system of claim 14, wherein the matrix comprises particles have a size selected to permit uniform packing within the degasser and wherein the particles are arranged in the degasser in a size gradient, and wherein water exiting the degasser is substantially free of organics and volatile gasses.

16. The system of claim 9, wherein energy of the system is supplied to the heat input vessel by at least one of electricity, geothermal energy, solar energy, steam, working fluid from recuperators, working fluid from solar heaters, working fluid from economizers, the combustion of any type of fuel, waste heat or heat pipes that transfer heat from heat sources, and wherein the heat is transferred to the boiler or evaporation chamber.

17. The system of claim 10, wherein the demister is positioned proximate to an output of the boiler or evaporation chamber, and wherein steam from the boiler or evaporation chamber enters the demister, and wherein the demister prevents condensed droplets from entering the condenser by means of baffle guards or metal grooves.

18. The system of claim 10, wherein the demister is controlled by at least one parameter selected from the group consisting of: a recess position of a clean steam outlet in the demister, a pressure differential across the demister, a resistance to flow of a steam inlet in the demister, and a resistance to flow of a steam outlet in the demister.

19. A method of purifying water using the system of claim 1, comprising the steps of:
providing a source of inlet water comprising at least one contaminant in a first concentration and comprising at least one contaminant in a second concentration;
modifying the pH of the inlet water to cause precipitation of insoluble hydroxides and separating the precipitates from the incoming water;
adding a source of carbonate ions and modifying the pH to cause precipitation of insoluble carbonates and separating the precipitates from the incoming water;
stripping this treated water of essentially all organics, volatiles, and gasses by counterflowing the inlet water against an opposite directional flow of a gas in a degasser;
maintaining the water in a boiler or evaporation chamber for an average residence time of at least 10 minutes under conditions permitting formation of steam;
discharging steam from the boiler or evaporation chamber to a demister;
separating clean steam from contaminant-containing waste in the demister;
condensing the clean steam to yield purified water;
recovering and transferring heat from a condenser chamber into a boiler or evaporation chamber or pre-heating chamber, such that the amount of heat recovered is at least 50%, 60%, 70%, 80%, 90% or more of the heat of condensation; and
repeating the evaporation, condensation, and demisting operations multiple times in order to re-use energy.

20. The method of claim 19, wherein the boilers or evaporation chambers, preheaters, and heat pipes are constructed from corrosion resistant materials.

21. The system of claim 1, wherein the system permits continuous operation of the purification system without requiring user intervention or cleaning of the purification system.

22. The system of claim 1, wherein vibrational energy in the form of mechanical vibration, electro-mechanical vibration, or high-frequency ultrasound is provided to the heat pipes to improve heat transfer.

23. The system of claim 1, wherein the heat pipes comprise a thin layer of hydrophobic coating.

24. The system of claim 1, wherein one or more of the heat pipes comprise a wick oriented towards the axis of the heat pipes.

25. The system of claim 1 additionally comprising a pre-heater comprising a condenser chamber, a separator plate with heat pipes, and a boiler chamber, wherein the contaminated water first enters the system at the pre-heater boiler chamber where it is pre-heated but not boiled by the heat pipes in the pre-heater, and wherein the contaminated water then passes to a degasser or a boiler chamber of a next stage.

26. The system of claim 1, wherein the energy of the system is supplied to the heat input vessel by at least one of electricity, geothermal energy, solar energy, steam, working fluid from recuperators, working fluid from solar heaters, working fluid from economizers, the combustion of any type of fuel, waste heat, or heat pipes that transfer heat from heat sources, and wherein the heat is transferred to the boiler of the heat input vessel and wherein the steam generated by the boiler of the heat input vessel is transferred to a condenser chamber of a stage.

27. The system of claim 1, wherein the system is configured so that product water at each stage is re-introduced into an upper condenser stage.

28. The system of claim 1, wherein the system is configured so that incoming pre-treated water is divided into separate streams and introduced into each separate stage for distillation.

* * * * *